(12) United States Patent
Baxter et al.

(10) Patent No.: US 9,791,082 B2
(45) Date of Patent: Oct. 17, 2017

(54) MODULAR FLUID END FOR A MULTIPLEX PLUNGER PUMP

(71) Applicant: Forum US, Inc., Houston, TX (US)

(72) Inventors: Winston Kirk Baxter, Alice, TX (US); Scott Allen Reeves, Corpus Christi, TX (US)

(73) Assignee: Forum US, Inc., Houston, TX (US)

( * ) Notice: Subject to any disclaimer, the term of this patent is extended or adjusted under 35 U.S.C. 154(b) by 870 days.

(21) Appl. No.: 13/835,045

(22) Filed: Mar. 15, 2013

(65) Prior Publication Data
US 2013/0263932 A1    Oct. 10, 2013

Related U.S. Application Data

(62) Division of application No. 12/879,066, filed on Sep. 10, 2010, now Pat. No. 8,465,268.

(51) Int. Cl.
*F16L 41/02* (2006.01)
*F04B 53/16* (2006.01)
*E21B 43/25* (2006.01)

(52) U.S. Cl.
CPC ............ *F16L 41/021* (2013.01); *E21B 43/25* (2013.01); *F04B 53/16* (2013.01); *Y10T 29/49236* (2015.01); *Y10T 137/0402* (2015.04); *Y10T 137/85938* (2015.04)

(58) Field of Classification Search
CPC ................ F16K 27/003; F15B 13/0807; F15B 13/0817; F15B 13/0821; F16L 41/03; F16L 41/021; F04B 53/16; E21B 43/25; Y10T 137/85938; Y10T 29/49236

USPC ....... 417/437, 360, 569, 454, 539, 515, 571; 137/884; 92/169.1, 146
See application file for complete search history.

(56) References Cited

U.S. PATENT DOCUMENTS

| | | | | |
|---|---|---|---|---|
| 2,241,197 | A | * | 5/1941 | Gift .......................... D06B 1/00 137/2 |
| 3,114,326 | A | | 12/1963 | Yaindl |
| 3,427,988 | A | * | 2/1969 | Schmieman ............ F04B 23/02 417/569 |
| 3,427,998 | A | | 2/1969 | Redman |
| 3,506,029 | A | * | 4/1970 | Demler, Sr. ............. F16L 41/03 137/561 R |
| 3,801,234 | A | | 4/1974 | Love et al. |

(Continued)

FOREIGN PATENT DOCUMENTS

| | | | | |
|---|---|---|---|---|
| CA | WO 2009070876 A1 | * | 6/2009 | ............ F04B 1/0413 |
| JP | WO 2009078461 A1 | * | 6/2009 | ............ F16L 19/005 |

OTHER PUBLICATIONS

Kemper Valve & Fittings, Flow Line Service and Stimulation Products, Jul. 15, 2003.

(Continued)

*Primary Examiner* — Nathan Zollinger
(74) *Attorney, Agent, or Firm* — Patterson & Sheridan, L.L.P.

(57) ABSTRACT

A modular fluid end for a multiplex plunger pump, each module machined from a single-piece steel forging with a plunger bore intersected by a linear suction/discharge bore and pumped fluid is discharged straight out through a top of the module into a discharge manifold made up using 1502 frac iron components. A compression clamp applies a crush load to opposed sides of the modules to extend service life.

13 Claims, 23 Drawing Sheets

(56) References Cited

U.S. PATENT DOCUMENTS

| | | | |
|---|---|---|---|
| 3,817,663 A | 6/1974 | Zehner | |
| 3,849,032 A | 11/1974 | Mulvey et al. | |
| 3,870,439 A | 3/1975 | Stachowiak et al. | |
| 4,277,229 A | 7/1981 | Pacht | |
| 4,388,050 A * | 6/1983 | Schuller | F04B 53/007 137/884 |
| 4,432,386 A | 2/1984 | Pacht | |
| 4,467,703 A * | 8/1984 | Redwine | F04B 53/162 417/539 |
| 4,551,077 A | 11/1985 | Pacht | |
| 4,775,303 A * | 10/1988 | Liska | F04B 53/164 277/522 |
| 4,878,815 A | 11/1989 | Stachowiak | |
| 5,059,101 A | 10/1991 | Valavaara | |
| 5,061,159 A | 10/1991 | Pryor | |
| 5,073,096 A | 12/1991 | King et al. | |
| 5,102,312 A | 4/1992 | Harvey | |
| 5,127,807 A | 7/1992 | Eslinger | |
| 5,171,136 A | 12/1992 | Pacht | |
| 5,253,987 A | 10/1993 | Harrison | |
| 5,299,921 A * | 4/1994 | Richter | F04B 53/1022 285/125.1 |
| 5,302,087 A | 4/1994 | Pacht | |
| 5,362,215 A * | 11/1994 | King | F04B 49/10 137/542 |
| 5,382,057 A | 1/1995 | Richter | |
| 5,823,093 A | 10/1998 | Kugelev et al. | |
| 5,924,853 A | 7/1999 | Pacht | |
| 6,171,070 B1 | 1/2001 | Mitake | |
| 6,196,256 B1 * | 3/2001 | Klampfer | F16L 41/03 137/269 |
| 6,241,492 B1 | 6/2001 | Pacht | |
| 6,382,940 B1 | 5/2002 | Blume | |
| 6,419,459 B1 | 7/2002 | Sibbing | |
| 6,544,012 B1 | 4/2003 | Blume | |
| 7,114,928 B2 | 10/2006 | Asayama et al. | |
| 7,118,349 B2 | 10/2006 | Oglesby | |
| 7,130,751 B2 * | 10/2006 | Kyllingstad | G01M 3/025 702/50 |
| 7,335,002 B2 | 2/2008 | Vicars | |
| 7,341,435 B2 | 3/2008 | Vicars | |
| 7,354,256 B1 | 4/2008 | Cummins | |
| 7,404,704 B2 | 7/2008 | Kugelev et al. | |
| 7,484,452 B2 | 2/2009 | Baxter et al. | |
| 7,506,574 B2 | 3/2009 | Jensen et al. | |
| 7,524,173 B2 | 4/2009 | Cummins | |
| 7,984,671 B2 | 7/2011 | Jensen et al. | |
| 8,465,268 B2 | 6/2013 | Baxter et al. | |
| 8,601,687 B2 * | 12/2013 | Ochoa | F04B 53/12 248/639 |
| 2006/0002806 A1 | 1/2006 | Baxter et al. | |
| 2008/0080992 A1 | 4/2008 | Cummins | |
| 2008/0111376 A1 * | 5/2008 | Ferrero | F16L 41/021 285/376 |
| 2008/0193299 A1 | 8/2008 | Oglesby | |
| 2010/0270795 A1 * | 10/2010 | Itou | F16L 19/005 285/401 |
| 2011/0052423 A1 | 3/2011 | Gambier et al. | |
| 2011/0081268 A1 * | 4/2011 | Ochoa | F04B 53/12 417/521 |

OTHER PUBLICATIONS

Halliburton Fluid Systems, Cementing, HT-400 Pump, the Industry Standard, H04798 04/06, 2006.

Badr, E. A., Sorem, J. R. Jr., and Tipton, S. M., Evaluation of the Autofrettage Effect on Fatigue Lives of Steel Blocks with Crossbores Using a Statistical and a Strain-Based Method, Journal of Testing and Evaluation, JTEVA, vol. 28, No. 3, May 2000, pp. 181-188.

* cited by examiner

MODULAR FLUID END FOR A MULTIPLEX PLUNGER PUMP

BACKGROUND OF THE INVENTION

Field of the Invention

This invention relates in general to multiplex plunger pumps used to pump well stimulation fluids at high volumes and very high pressures and, in particular, to a modular fluid end for multiplex plunger pumps.

Description of the Related Art

Multiplex plunger pumps are commonly used in the oil and gas industry and are well known in the art. They have a fluid end and a power end that drives the fluid end. Multiplex plunger pumps used to pump well stimulation fluids generally have power ends rated at 2,000 horse power or more. The fluid ends of those pumps frequently have a service life of less than 200 hours because the well stimulation fluids are generally abrasive and/or corrosive and must often be pumped at rates of up to 100 bbl/minute and pressures of 10,000 psi or more.

Multiplex plunger pump fluid ends are either monoblock or modular constructions. Many improvements for extending the service life and/or facilitating the maintenance of both types have been invented. However, short service life and/or complex maintenance requirements persist.

There therefore exists a need for a fluid end for a multiplex plunger pump that is simpler and less costly to manufacture and maintain than other multiplex plunger pump fluid ends that are currently available.

SUMMARY OF THE INVENTION

It is therefore an object of the invention to provide a fluid end for a multiplex plunger pump that is simpler and less costly to manufacture and maintain.

The invention therefore provides a modular fluid end for a multiplex plunger pump, comprising: at least two fluid end modules arranged in a side-by-side relationship, each of the fluid end modules having a cylinder with a plunger bore that receives a plunger, an intake end and a discharge end with a linear suction/discharge bore through the intake end and the discharge end that intercepts the plunger bore, the discharge end being connected directly to a discharge manifold; and a compression clamp that is independent of the at least two fluid end modules, the compression clamp applying a crush load to opposite sides of respective outermost ones of the at least two fluid end modules.

The invention further provides a fluid end module for a multiplex plunger pump, comprising: a cylinder with a plunger bore, and a suction/discharge bore that intercepts the plunger bore at right angles and extends straight through an intake end on one side of the cylinder and a discharge end on the other side of the cylinder; a mounting plate on an inner end of the cylinder; and a crush load transfer boss on each side of the cylinder, the respective crush load transfer bosses being aligned with the interception of the plunger bore and the suction/discharge bore.

The invention yet further provides a method of constructing a discharge manifold for a modular multiplex pump, comprising: connecting a 1502 iron tee fitting to a discharge port of at least one module of the pump; connecting a 1502 iron cross fitting to a discharge port of at least one other module of the pump; and connecting the at least one tee fitting and the at least one cross fitting together to construct the discharge manifold.

BRIEF DESCRIPTION OF THE DRAWINGS

Having thus generally described the nature of the invention, reference will now be made to the accompanying drawings, in which.

DETAILED DESCRIPTION

The invention provides a modular fluid end for a multiplex plunger pump. Each module is machined from a single-piece steel forging and has a plunger bore intersected by a linear suction/discharge bore, so pumped fluid is discharged straight out through a top of the module into a discharge manifold assembled from readily available "frac iron" (1502 iron) components. A compression clamp applies a crush load to opposite sides of the modules in the modular fluid end to reduce stress and increase service life. The fluid end modules are less expensive to construct than prior art monoblock or modular fluid ends because material use is reduced; machining is significantly simplified and can be accomplished using only a lathe; and, the discharge manifold is made up using readily available stock. Furthermore, many existing power ends for multiplex plunger pumps may be retrofitted with at most minor modifications to accept the modular fluid end in accordance with the invention.

Figure 1:
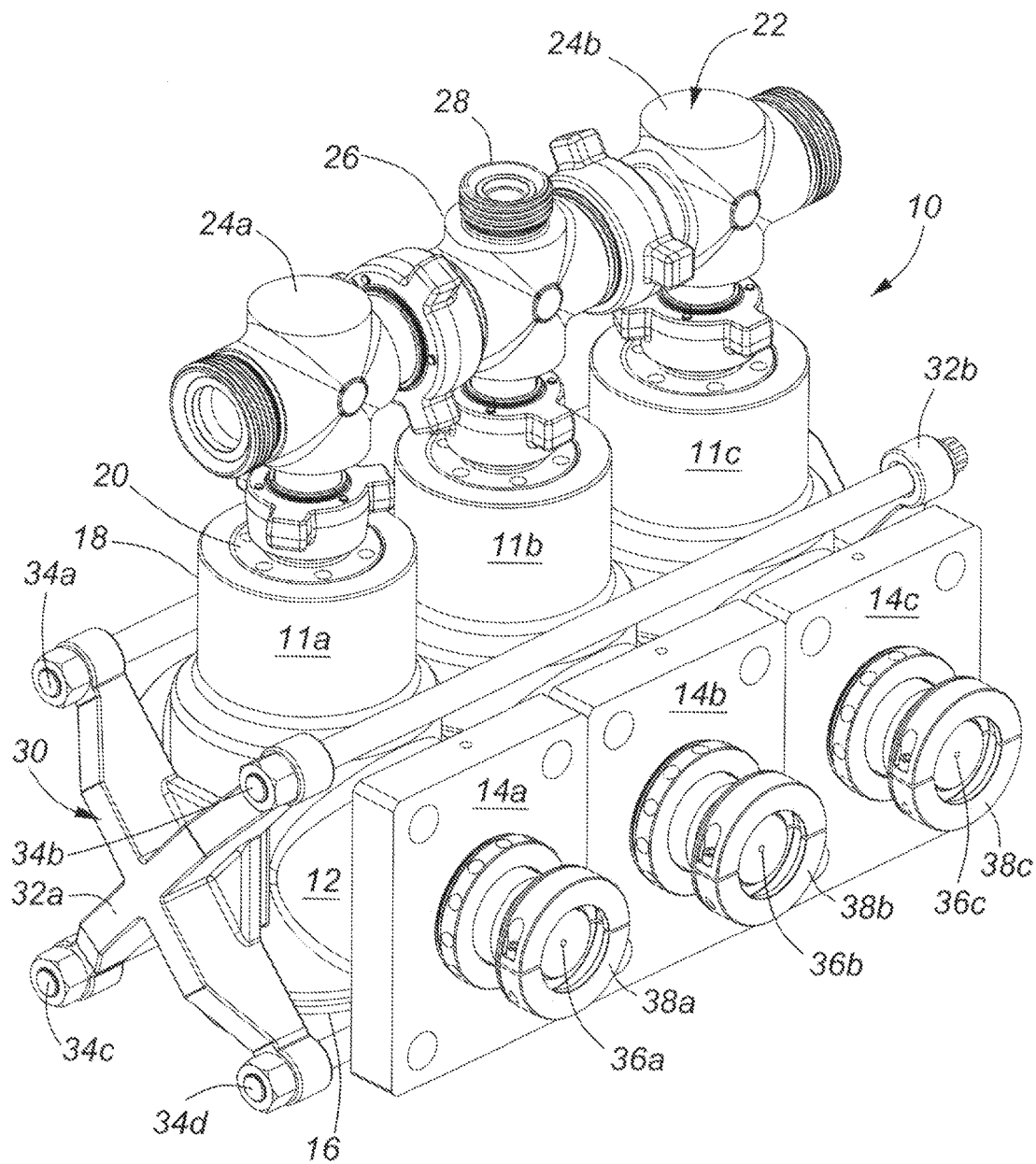
FIG. 1 is a rear perspective view of a triplex fluid end in accordance with one embodiment of the invention.

FIG. 1 is a rear perspective view of a fluid end 10 in accordance with one embodiment of the invention. In this embodiment the fluid end 10 is for a triplex plunger pump having a power end (not shown) that drives three pump plungers in a mariner well known in the art. The fluid end 10 includes three fluid end modules 11a, 11b and 11c, arranged in a side-by-side relationship. The construction of the fluid end modules, hereinafter referred to simply as fluid end modules 11, will be explained below with reference to FIGS. 7 and B. The fluid end modules 11a, 11b and 11c are identical and interchangeable. As will be understood by those skilled in the art, a fluid end for a multiplex plunger pump is not limited to the triplex configuration shown.

Each fluid end module 11 is forged from a single piece of high tensile strength steel. In one embodiment the steel is AISI 4340 steel that is heat treated to a yield strength (ys) of at least 110 ksi. The machining required on the forged module is readily accomplished on a lathe rather than a milling machine, which conserves both time and expense.

Each fluid end module 11 has a cylinder 12 that terminates on a rear end in a mounting plate 14 (e.g. 14a, 14b, 14c) used to mount the fluid end module 11 to the multiplex plunger pump power end. Each fluid end module 11 further includes an intake (suction) end 16 to which a suction manifold (not shown) is connected, and a discharge end 18 having a threaded discharge bore that receives a discharge cover nut 20 to which a discharge manifold 22 is directly connected. As noted above, the discharge manifold 22 is assembled from 1502 frac iron fittings that are commercially available and well known in the art. In one embodiment the discharge manifold 22 is constructed from 1502 frac iron tee bodies 24a, 24b and a 1502 frac iron cross body 26. The cross body 26 has a top port 28 with a pin thread adapted to support the connection of a pressure valve (not shown) in a manner well known in the art, to provide a dynamic reading of a fluid discharge pressure of the fluid end 10.

The respective fluid end modules 11 are clamped together by a compression clamp 30 that is independent of the respective fluid end modules 11 and applies a predetermined crush load to opposite sides of the outermost ones of the fluid end modules 11, e.g. fluid end modules 11a and 11c. The crush load thus applied is distributed though contact to each of the fluid end modules 11, and reduces stress on the respective fluid end modules 11 to lengthen their service life. In this embodiment, the compression clamp 30 includes two compression clamp plates 32a, 32b, which are "spider plates" drawn together by four compression clamp fasteners 34 (34a-34d). In one embodiment, the spider plates 32a, 32b are AISI 4340 cast steel heat treated to a yield strength (ys) of 130 ksi. In one embodiment, the compression clamp fasteners 34 are Maxbolt™. Load Indicating Fasteners available from Valley Forge & Bolt. Manufacturing Company in Phoenix, Ariz., U.S.A. Each compression clamp fastener 34 has a 120 ksi proof strength and is tightened to 90%-100% fastener tension, so that the compression clamp 30 applies about 360,000 lb of crush load to fluid end modules 11.

As will be explained below in detail with reference to FIG. 7, each fluid end module 11 has a plunger bore through its cylinder 12 that receives a respective plunger 36a-36c. Each plunger is connected to a plunger drive (not shown) of the power end by a respective plunger clamp 38a-38c.

Figure 2:
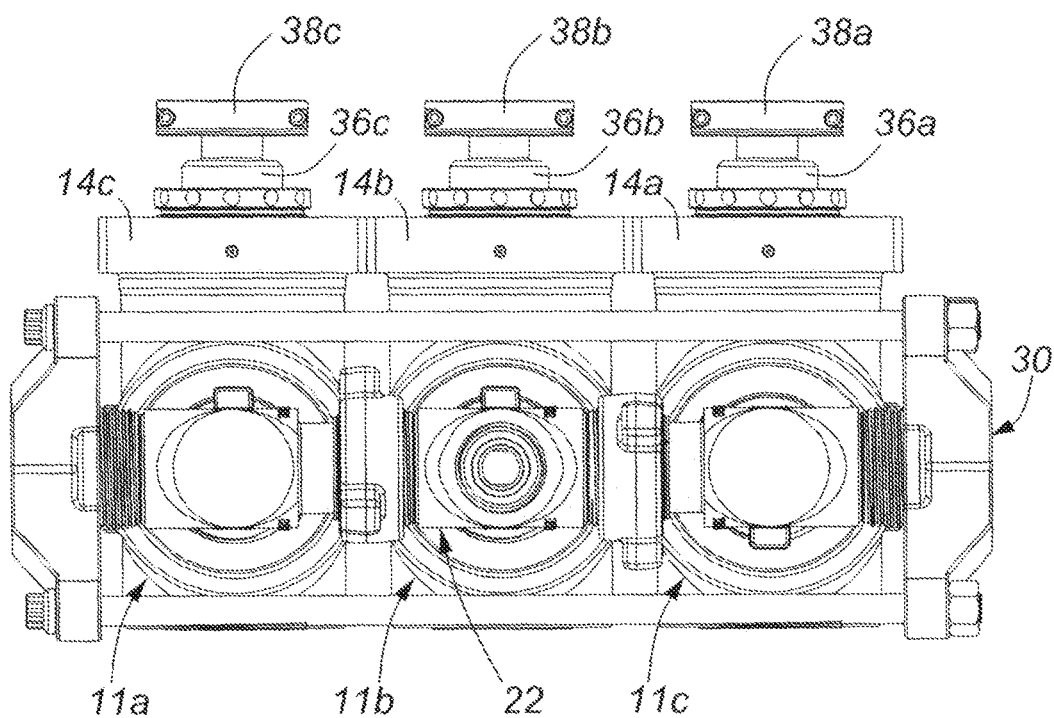
FIG. 2 is a top plan view of the fluid end shown in FIG. 1.

FIG. 2 is a top plan view of the fluid end shown in FIG. 1. As can be seen, the only points of contact between the fluid end modules 11 is along mating edges of the mounting plates 14a-14c, and at crush load transfer bosses 40 (see FIG. 3) forged on opposite sides of the respective fluid end modules 11a, 11b and 11c. The crush load transfer bosses 40 are respectively aligned with an intersection of the plunger bore that receives the plunger 36 and a linear suction/discharge bore that extends through the intake end 16 and the discharge end 18 and intersects the plunger bore at a right angle.

Figure 3:
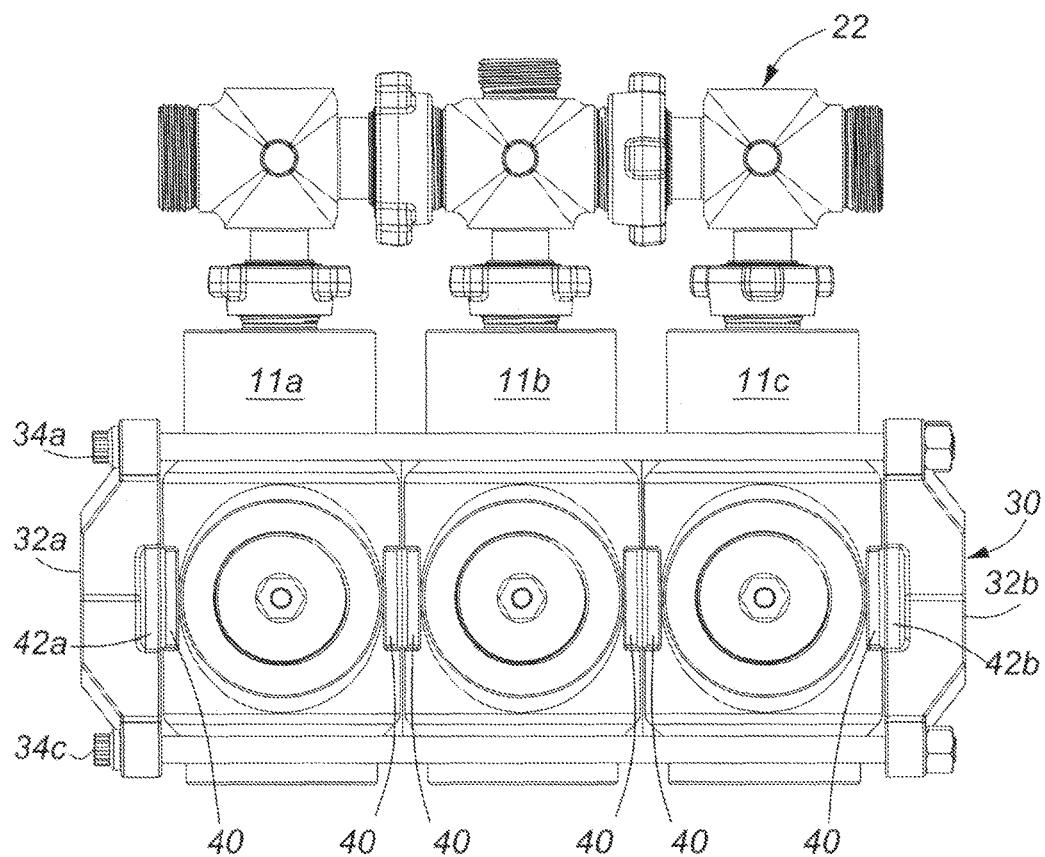
FIG. 3 is a front elevational view of the fluid end shown in FIG. 1.

FIG. 3 is a front elevational view of the fluid end shown in FIG. 1. As explained above, the crush load transfer bosses 40 forged on opposite sides of the respective fluid end modules 11 transfer the crush load applied by crush load plate bosses 42a, 42b of the compression clamp 30. In one embodiment the respective crush load transfer bosses 40 are rectangular and have substantially planar outer surfaces that measure about 5" by 5.75", and the crush load plate bosses 42a, 42b are about the same size. However, it should be understood that the size and shape of the crush load transfer bosses 40 and the crush load plate bosses 42 is, within readily understood limits, a matter of design choice.

Figure 4:
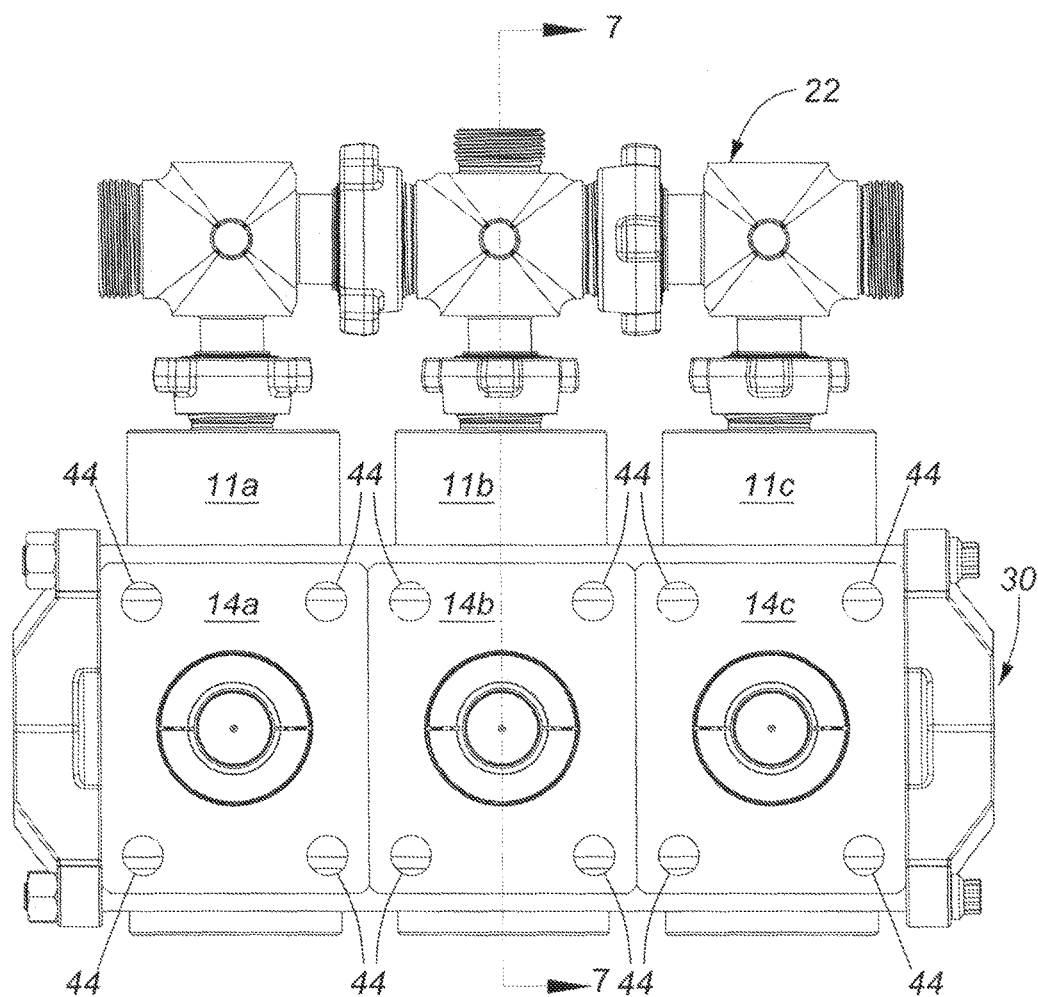
FIG. 4 is a rear elevational view of the fluid end shown in FIG. 1.

FIG. 4 is a rear elevational view of the fluid end shown in FIG. 1. Each mounting plate 14a-14c includes a plurality of mounting bores 44 that receive threaded fasteners used to mount the respective fluid end modules 11a, b and 11c to a power end of a multiplex plunger pump. In this embodiment, each fluid end module has four mounting bores 44. However, the number and the position of the mounting bores 44 is a matter of design choice and may be dictated by the construction of the power end to which the fluid end module 11 is to be mounted.

Figure 5:
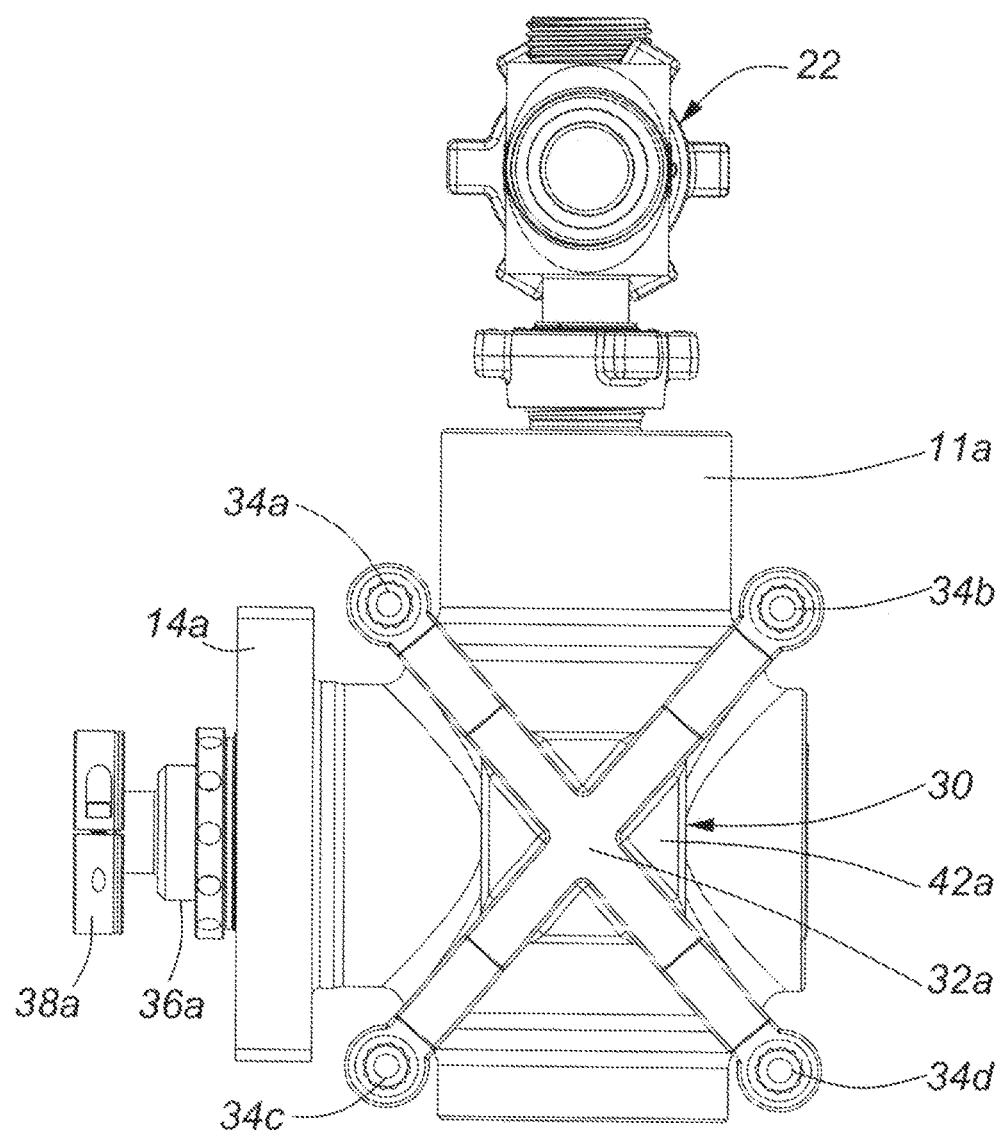
FIG. 5 is an end elevational view of the fluid end shown in FIG. 1.

FIG. 5 is an end elevational view of the fluid end shown in FIG. 1. As can be seen in FIGS. 1-5, the only points of contact between the compression clamp 30 and the fluid end modules 11 are between the crush load plate boss 42a and the corresponding crush load transfer boss 40 on the fluid end module 11a, and the crush load plate boss 42b and the corresponding crush load transfer boss 40 on the fluid end module 11c. The crush load fasteners 34a-34d do not contact the respective fluid end modules 11a-11d.

Figure 6:
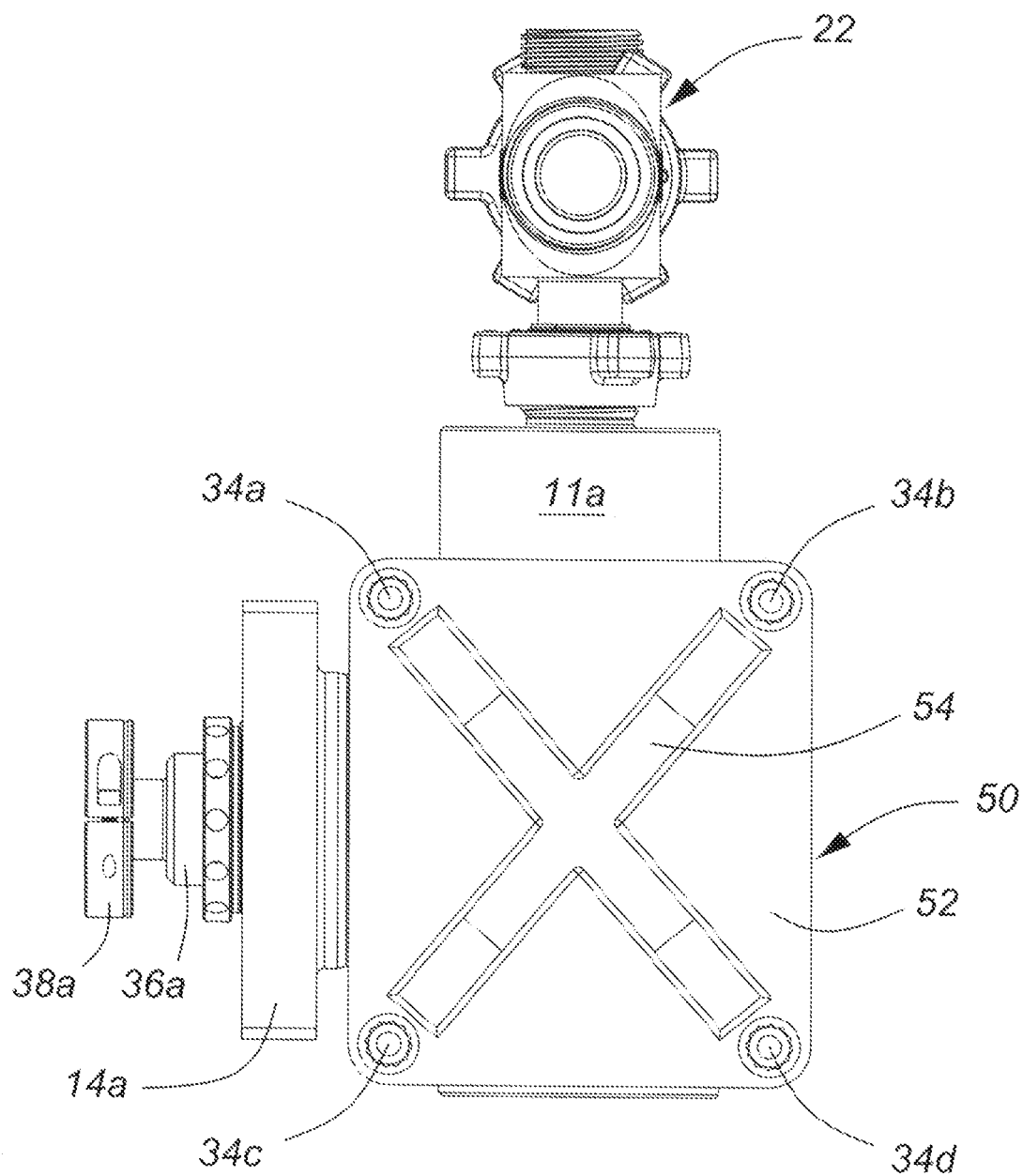
FIG. 6 is an end elevational view of an alternate embodiment of the fluid end in accordance with the invention.

FIG. 6 is an end elevational view of an alternate embodiment of the fluid end in accordance with the invention. This embodiment of the invention is identical to the embodiment described with reference to FIGS. 1-5 except that a compression clamp 50 has rectangular compression clamp plates 52 with an X-shaped reinforcing rib 54. In one embodiment the reinforcing rib 54 is welded to the compression clamp plate 52, and both the compression clamp plate 52 and the reinforcing rib 54 are AISI 4330 steel that is heat treated to a yield strength (ys) of about 130 ksi. As will be understood by those skilled in the art, the shape and configuration of the compression clamps 30, 50 is a matter of design choice and is immaterial provided that a compression clamp can apply an adequate crush load to the crush load transfer bosses 40 of fluid end modules 11.

Figure 7:
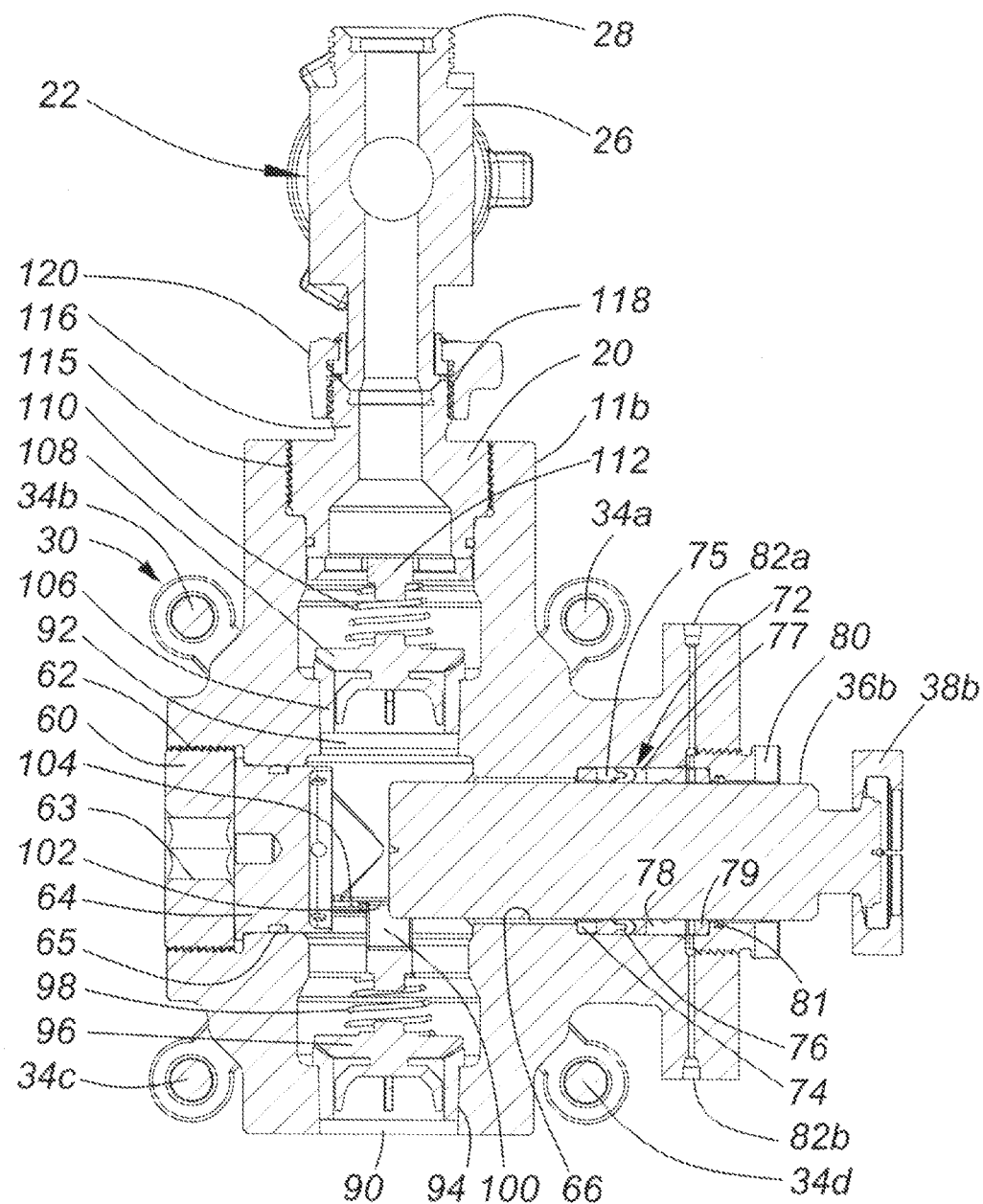
FIG. 7 is a cross-sectional view of a fluid end module in accordance with the invention, taken along line 7-7 shown in FIG. 4.

FIG. 7 is a cross-sectional view of the fluid end module 11 in accordance with the invention, taken along line 7-7 shown in FIG. 4. A plunger bore cover nut 60 threadedly engages a plunger bore cover nut thread 62. A hexagonal socket 63 in the plunger bore cover nut 60 accepts a key (not shown) that is used to disengage the plunger bore cover nut 60 from the plunger bore cover nut thread 62 to provide access to a plunger bore cover 64, the removal of which permits inspection and maintenance of plunger 36b and suction/discharge valve components described below.

A peripheral groove in the plunger bore cover 64 receives a fluid seal 65 that seals an outer end of a plunger bore 66. The opposite end of the plunger bore 68 receives the plunger 36b, which is reciprocated in the plunger bore 66 to pump fluids through the fluid end module 11 in a manner known in the art. As explained above, the plunger 36b is connected to a reciprocating drive (not shown) of the power end by the plunger clamp 38b. The plunger end of the plunger bore 66 is sealed by packing in a stuffing box 72. In one embodiment, the packing includes: a packing junk ring 74; a packing header ring 75; a packing pressure ring 76; a packing top adapter 77; a packing bushing 78 and, a packing lantern ring 79. A packing nut or gland 80 compresses the packing around an outer periphery of the plunger 36b to provide a high-pressure seal. A packing wiper seal 81 received in a peripheral groove in the packing nut 80 seals the stuffing box 72. Lubrication ports 82a, 82b permit lubricant (not shown) to be pumped through the packing lantern ring 79 into the stuffing box 72, as required.

A suction bore 90 is axially aligned with a discharge bore 92. A suction valve seat 94 is frictionally retained in the suction bore 90. A suction valve 96 is urged onto the suction valve seat 94 by a spiral suction valve spring 98. A top end of the suction valve spring is captured on a nipple of a suction valve stop 100. A top end of the suction valve stop 100 has suction valve stop wings 102 (see FIG. 8) that are received in a suction valve stop groove 104. The plunger bore cover 64 retains the suction valve stop wings 102 in the suction valve stop groove.

A discharge valve seat 106 is frictionally retained in the discharge bore 92. A discharge valve 108 is urged onto the discharge valve seat 106 by a spiral discharge valve spring 110. A top end of the discharge valve spring is captured on a nipple of a discharge valve stop 112. The discharge valve stop 112 is retained in the discharge bore 106 by a discharge cover nut 20 that engages a discharge cover nut box thread 115 in the discharge bore 92. The discharge cover nut 20 has a protruding axial neck 116 with a pin thread 118 engaged by a wing nut 120 of the 1502 frac iron cross body 26 used to make up the discharge manifold 22.

Figure 8:
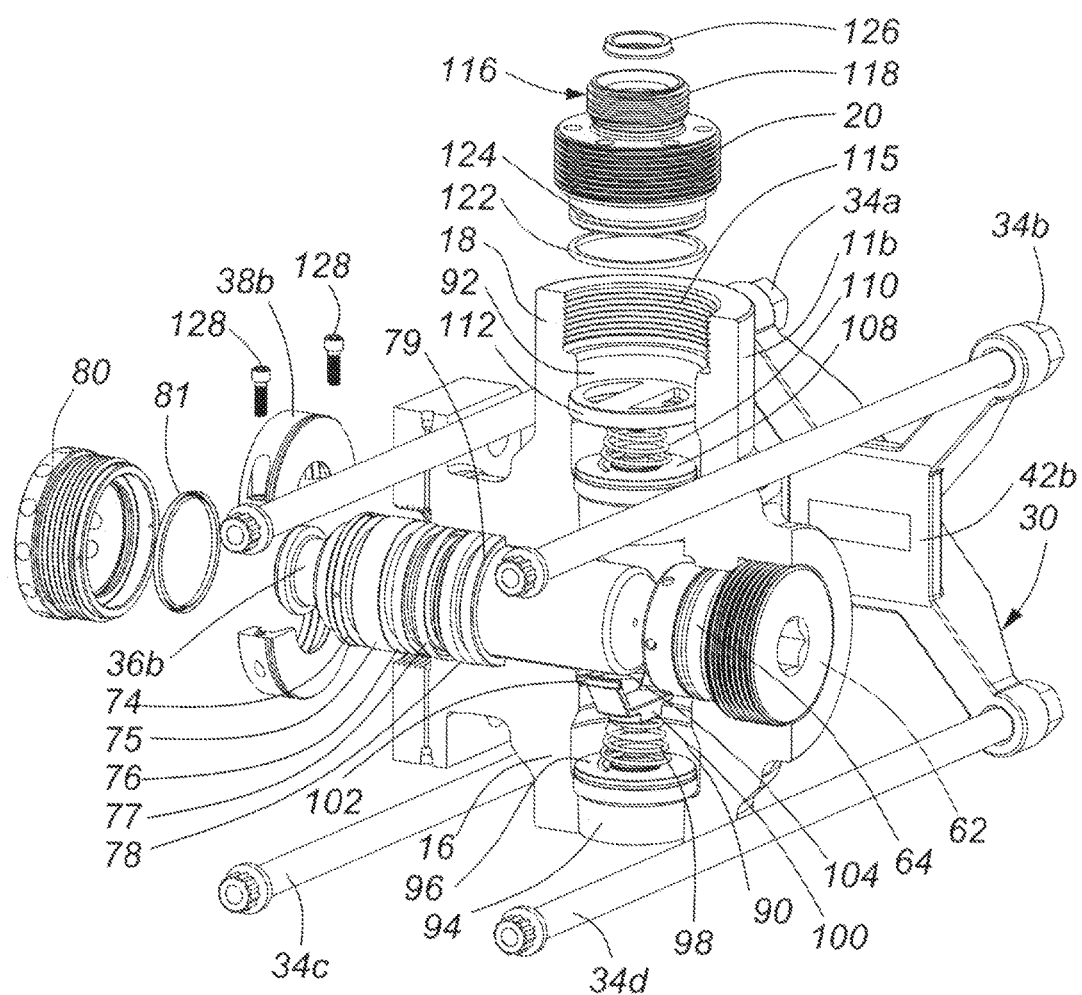
FIG. 8 is a cross-sectional exploded view of a fluid end module shown in FIG. 7.

FIG. 8 is a cross-sectional exploded view of the fluid end module shown in FIG. 7. Most of the valve components shown in FIG. 8 have been explained above with reference to FIG. 7 and that description will not be repeated. Pumped fluid is inhibited from leaking around the discharge cover nut 20 by a discharge cover nut seal 122 received in a discharge cover nut seal groove 124. Pumped fluid is inhibited from leaking around between the 1502 frac iron cross body 26 and the discharge cover nut by a seal ring 126 received in a top of the protruding axial neck 116. The plunger clamp 38b is a two-piece clamp held together by cap screws 128.

As we understood by those skilled in the art, in operation the plungers 36 are reciprocated in the plunger bores 66 by a multiplex pump power end so they travel through a suction stroke as the plunger 36 is drawn away from the plunger bore cover 64 and a discharge stroke as the plunger 36 is pushed into the plunger bore cover 64. On the suction stroke the discharge valve 108 is pulled closed and the suction valve 96 is drawn by suction away from the suction valve seat 94. Fluid flows up through the suction bore 90 from a suction manifold (not shown) and into the plunger bore 66. On the discharge stroke, the suction valve 96 is forced down onto the suction valve seat 94 and the discharge valve 108 is forced open as the fluid drawn into the plunger bore 66 on the suction stroke is discharged into the discharge manifold 22 on the discharge stroke.

If any one of the fluid end modules 11 fails during operation, it can be quickly replaced by removing the compression clamp 30, 50 and disconnecting the fluid end module 11 from the power end by removing fasteners from the mounting bores 44 and the plunger clamp 38. A new or refurbished fluid end module 11 is then mounted to the power end by reversing this process. Consequently, a mechanical failure in one fluid end module does not necessitate replacement of the entire fluid end, as in the case of monoblock fluid ends.

Figure 9A:
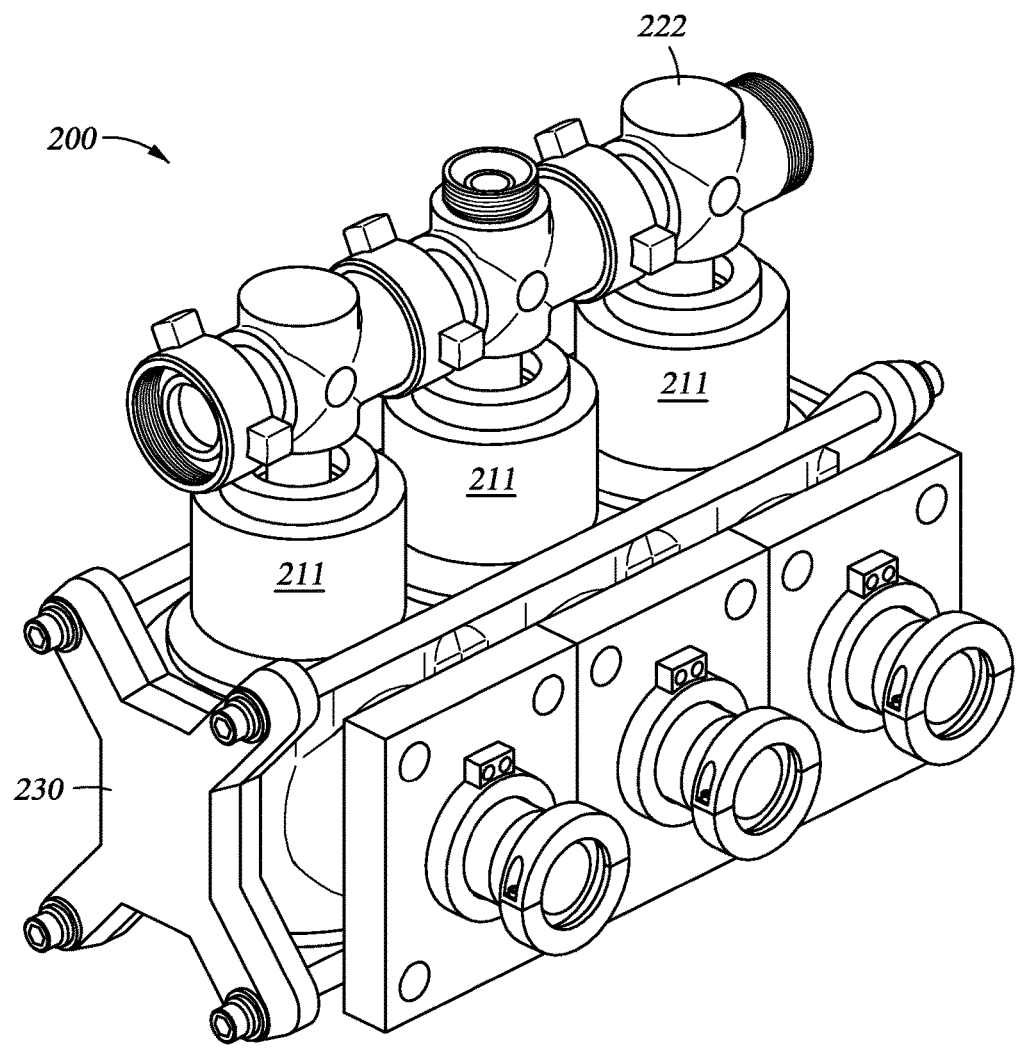
FIG. 9A is a rear perspective view of a triplex fluid end in accordance with one embodiment of the invention.

FIG. 9A is a rear perspective view of a fluid end 200 in accordance with one embodiment of the invention. The fluid end 200 is similar to the fluid end 10 described above, the full operation of which will not be repeated herein for brevity. Similar components may be identified with the same reference numbers but with a 200-series designation, such as the discharge manifold 222, the fluid end modules 211, and the compression clamp 230. Some of the differences between the fluid end 10 and the fluid end 200 include the connection of the discharge manifold 222 to each fluid end module 211, and the compression clamp 230.

Figure 9B:
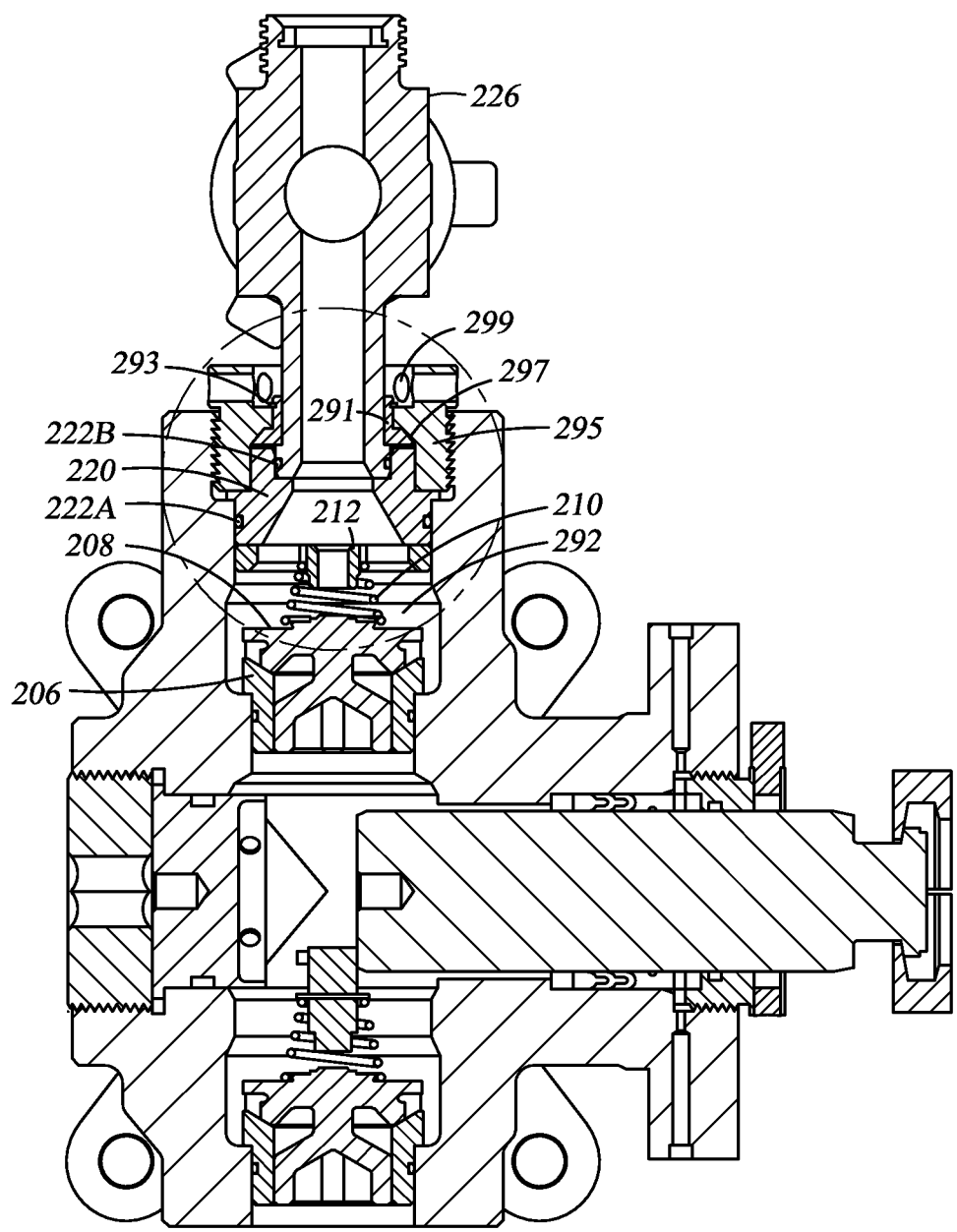
FIG. 9B is a cross-sectional view of the triplex fluid end in accordance with one embodiment of the invention.
Figure 9C:
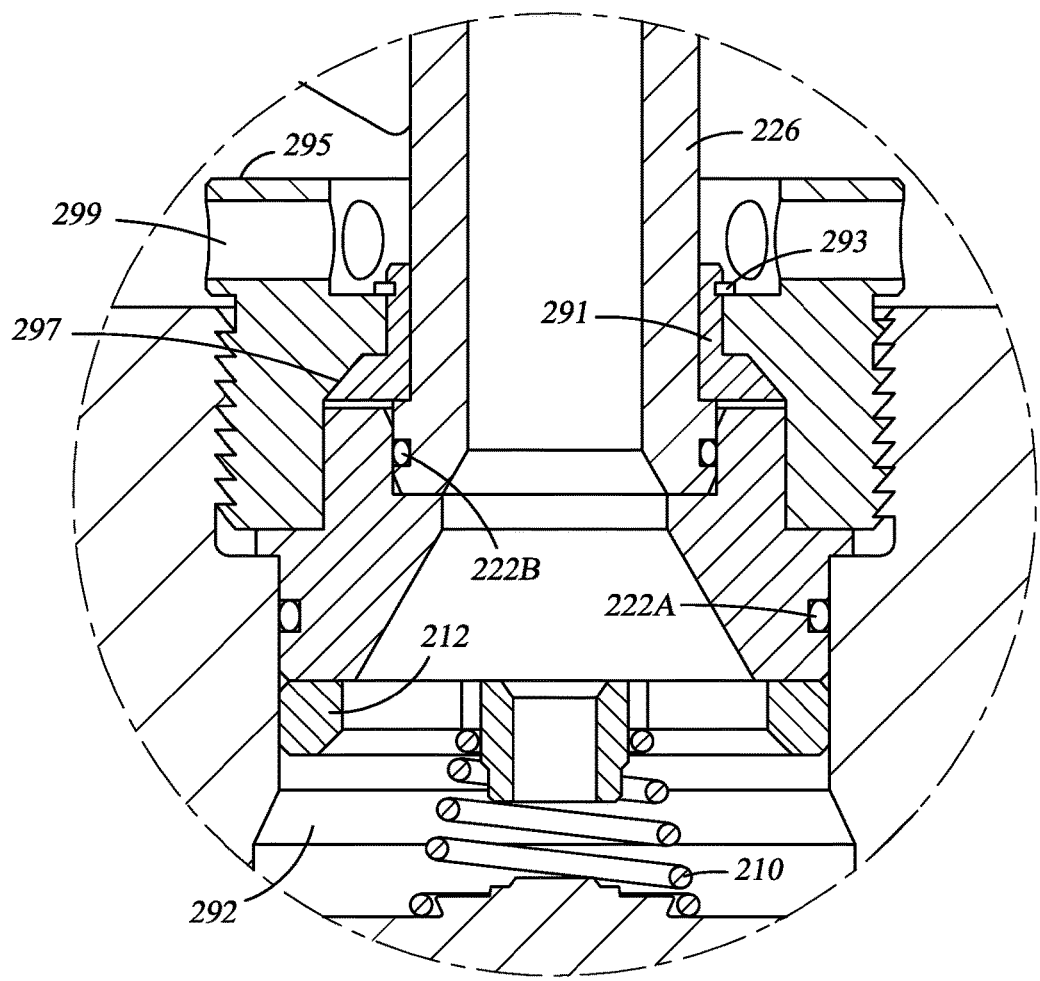
FIG. 9C is an enlarged view of a portion of the cross-sectional view of the triplex fluid end in accordance with one embodiment of the invention.

Referring to FIGS. 9B and 9C, the lower end of the body 226 (such as the cross or tee bodies of the discharge manifold 222) is connected to the upper end of the fluid end module 211 via a quick connect/disconnect collar 295. As illustrated in FIGS. 9B and 9C, the discharge valve stop 212 (which helps maintain the discharge valve 208 against the discharge valve seat 206 via spring 210) may be retained in the discharge bore 292 by a discharge seal carrier 220. The discharge seal carrier 220 may be retained by the collar 295 as further described below.

A seal 222A, such as an o-ring, is provided between the discharge seal carrier 220 and the discharge bore 292. The collar 295 may be secured to the lower neck portion of the body 226, and then may be threaded into engagement with the discharge bore 292 or discharge end/port of the fluid end module 211. The lower end of the collar 295 may engage a shoulder on the upper end of the discharge seal carrier 220 that abuts an inner shoulder of the discharge bore 292. The lower neck portion of the body 226 may also engage the discharge seal carrier 220 such that the bore of the body 226 is in fluid communication with the bore of the discharge seal carrier 220 and the discharge bore 292. A seal 222B, such as an o-ring, may be provided between the discharge seal carrier 220 and the lower neck portion of the body 226.

A split ring 291 and a snap ring 293 may be used to secure the collar 295 to the lower neck portion of the body 226. In particular, the lower neck portion of the body 226 may be inserted through the bore of the collar 295, and then the split ring 291 may be positioned around the lower neck portion of the body 226. The split ring 291 may include a shoulder 297 that engages outer and inner shoulders on the lower neck portion of the body 226 and the bore of the collar 295, respectively, to prevent the lower neck portion of the body 226 from being withdrawn from the collar 295. The snap ring 293 may secure the split ring 291 to the collar 295.

One or more bores 299 are formed about the outer circumference of the upper end of the collar 295. A tools, such as a breaker bar or wrench end, may be inserted into the bores 299 to provide a sufficient amount of torque to rotate the collar 295 (relative to the lower neck portion of the body 222) into and out of threaded engagement with the discharge bore 292 or discharge end/port of the fluid end module 211. In this manner, the discharge manifold 222 may be easily and quickly connected to and disconnected from the fluid end modules 211 as necessary. Access to the internal components of the fluid end 200, such as the valves, springs, valve seats, seals, etc., for maintenance, repair, and/or replacement is easily achieved.

Figure 10A:
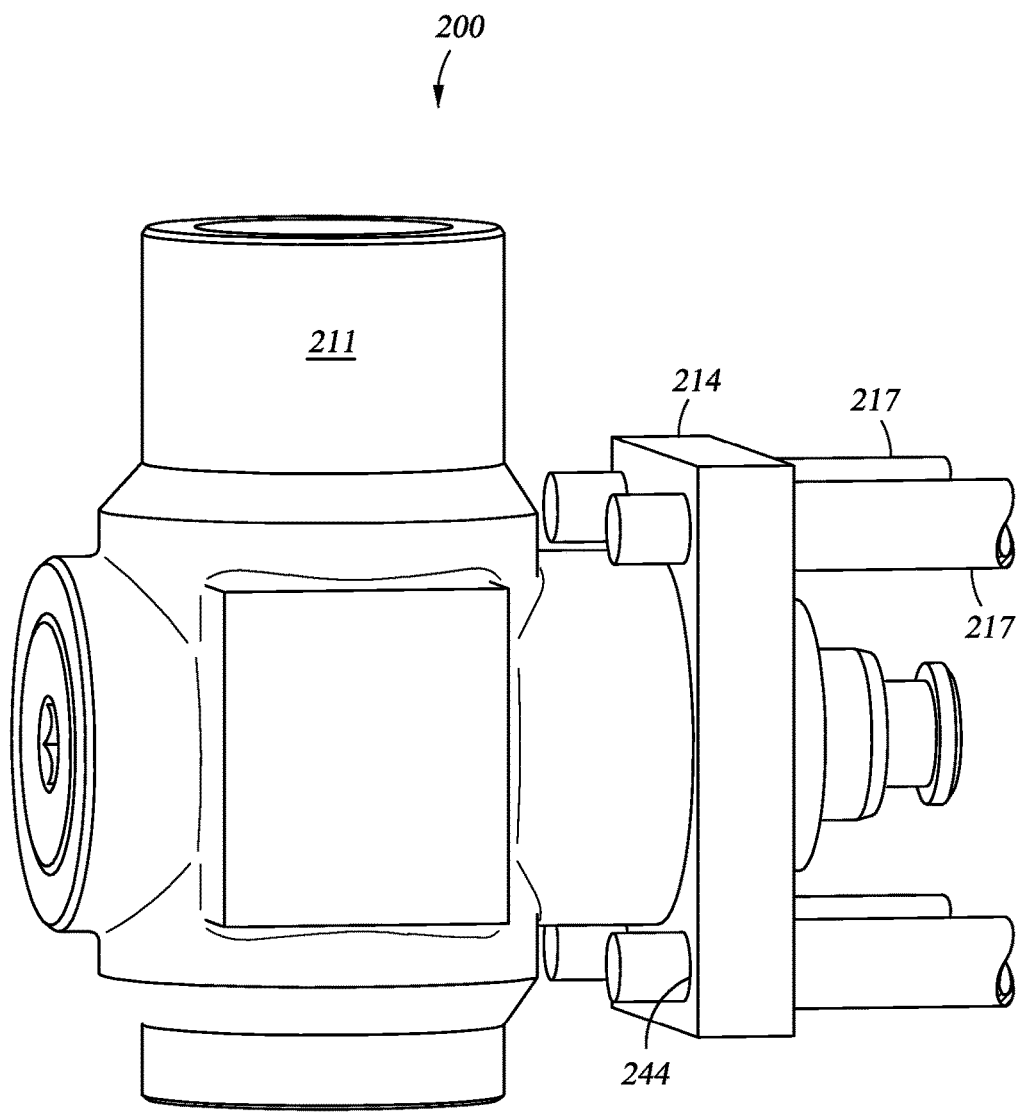
FIG. 10A-10D illustrates an assembly sequence of the triplex fluid end in accordance with one embodiment of the invention.
Figure 10B:
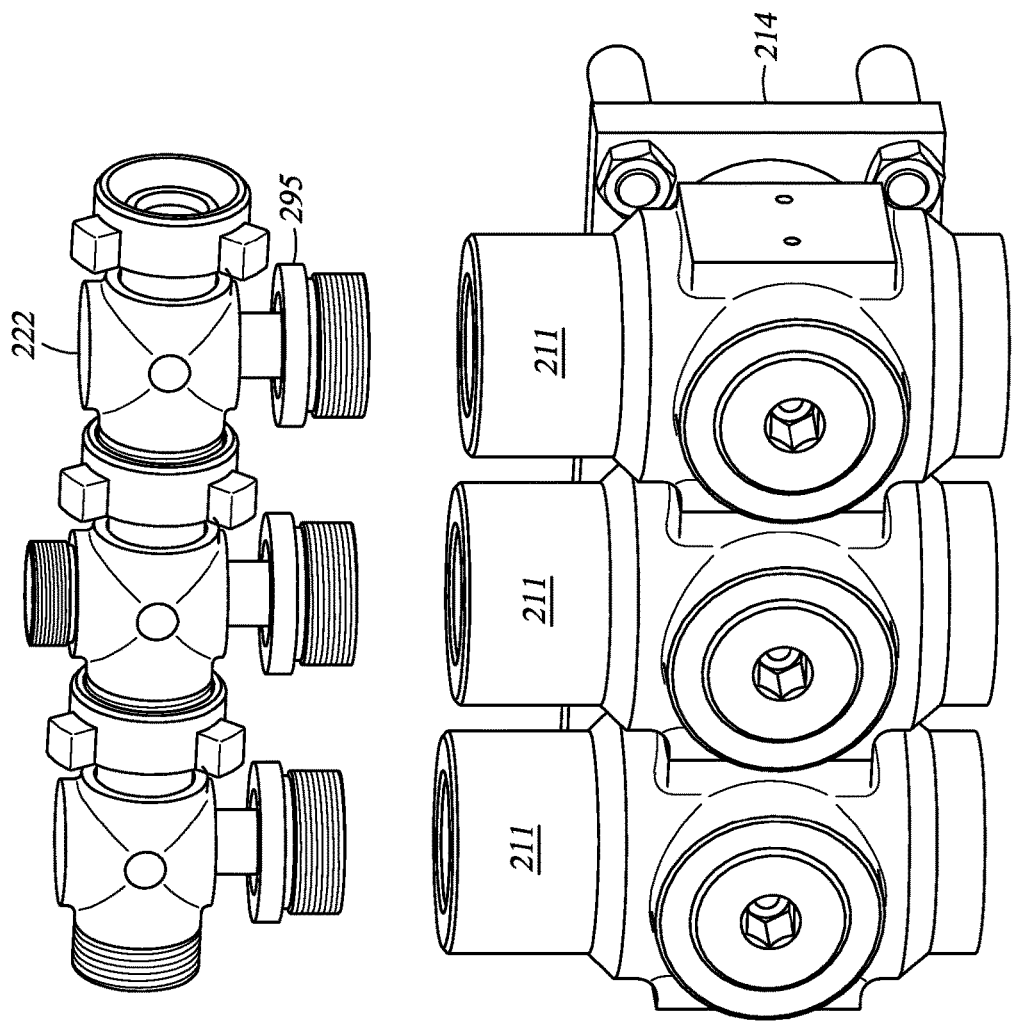
Figure 10C:
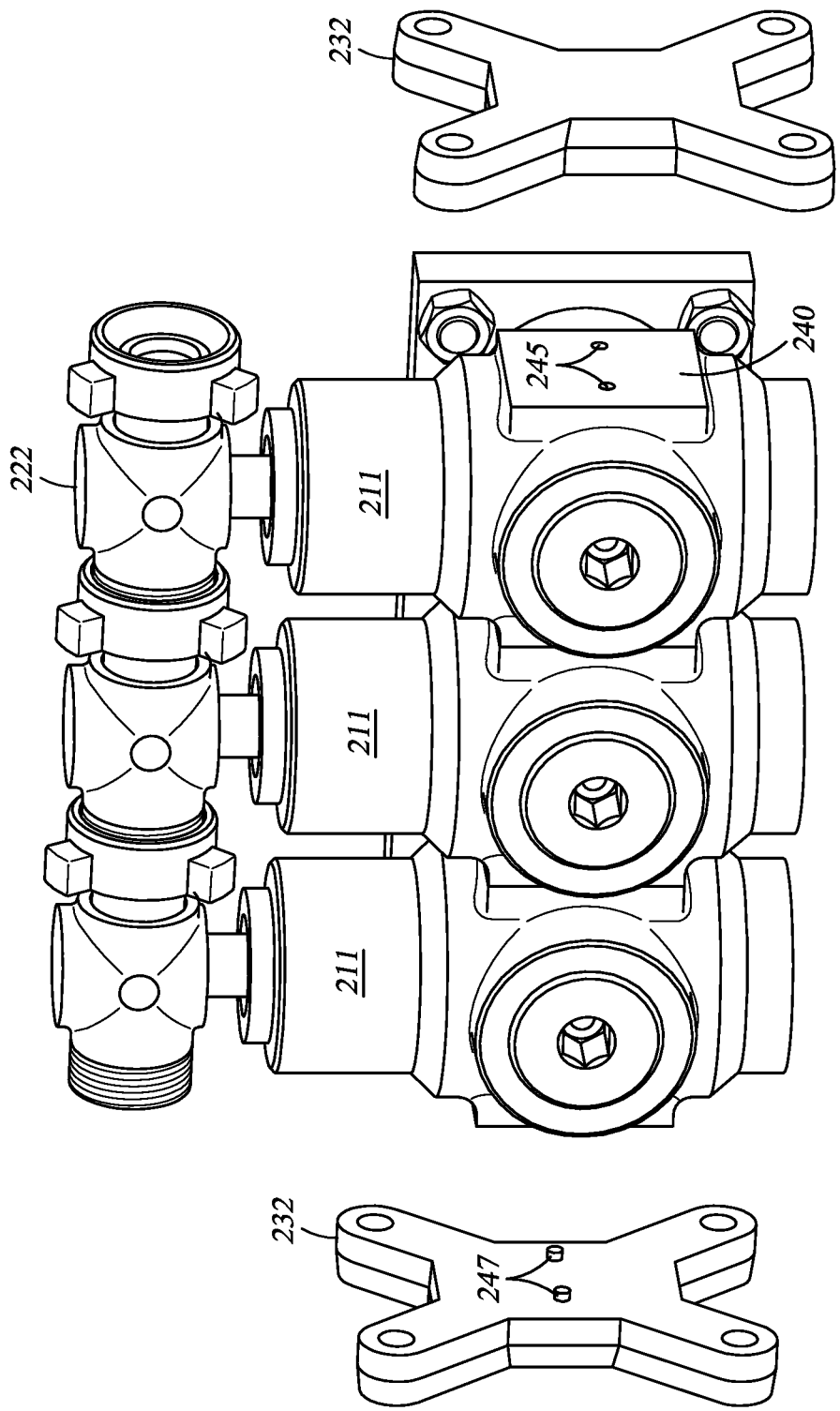

FIG. 10A-10D illustrates an assembly sequence of the fluid end 200 according to one embodiment. As shown in FIGS. 10A and 10B, each fluid end module 211, collectively or individually, may be secured to a pump or pump frame by one or more support rods 217 that are coupled to the mounting plate 214 via mounting bores 244. The discharge manifold 222 may be formed and connected to each fluid end module 211 using the collar 295 connection described above. As shown in FIG. 10C, the crush load transfer bosses 240 disposed on opposite sides of each fluid end module 211 may include one or more bores 245 for supporting pin members 247 to align the fluid end modules 211 and the compression clamp plates 232 together.

Figure 10D:
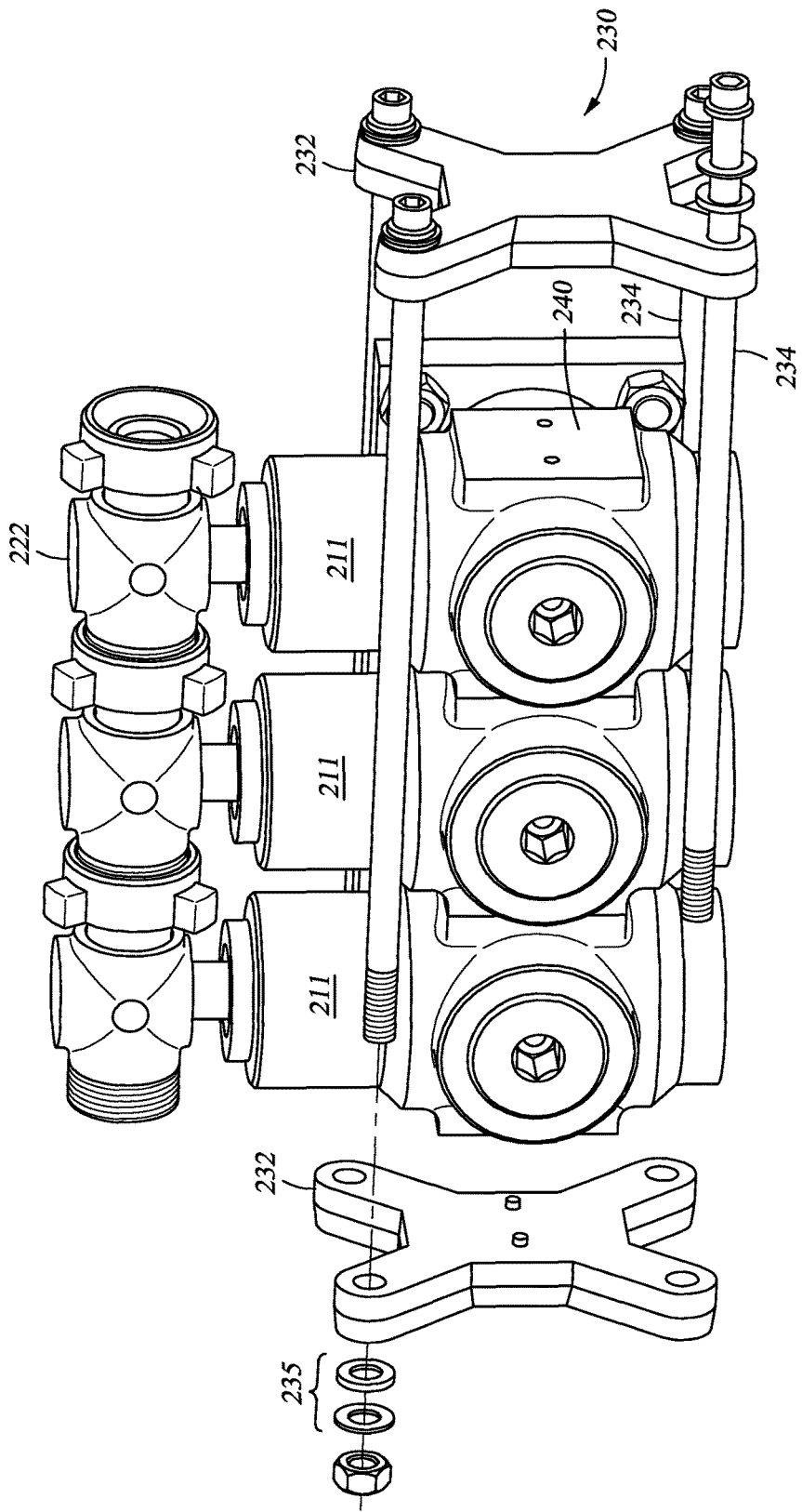

As shown in FIG. 10D, the fluid end modules 211 are clamped together by the compression clamp 230 that applies a predetermined load to opposite sides of the outermost fluid end modules 211 to reduce stress on the fluid end modules 211 during operation. The compression clamp 230 includes two compression clamp plates 232 drawn together by four compression clamp fasteners 234. The compression clamp fasteners 234 may be bolted together, and may include spherical washers 235 disposed between the compression clamp fasteners 234 and the compression clamp plates 232 that are configured to reduce bending of the compression clamp plates 232 at the outermost edges.

Each compression clamp plate 232 may include a generally planar, square or rectangular shaped middle section with arm portions extending from each corner thereby forming an overall X-shaped configuration. The compression clamp 230 may be entirely disposed external to the fluid end 200 such that the only points of contact are between the crush load transfer bosses 240 and the middle section of the compression clamp pates 232. The compression clamp 230 may be configured to reduce stress on the fluid end modules 211 during operation.

Figure 11A:
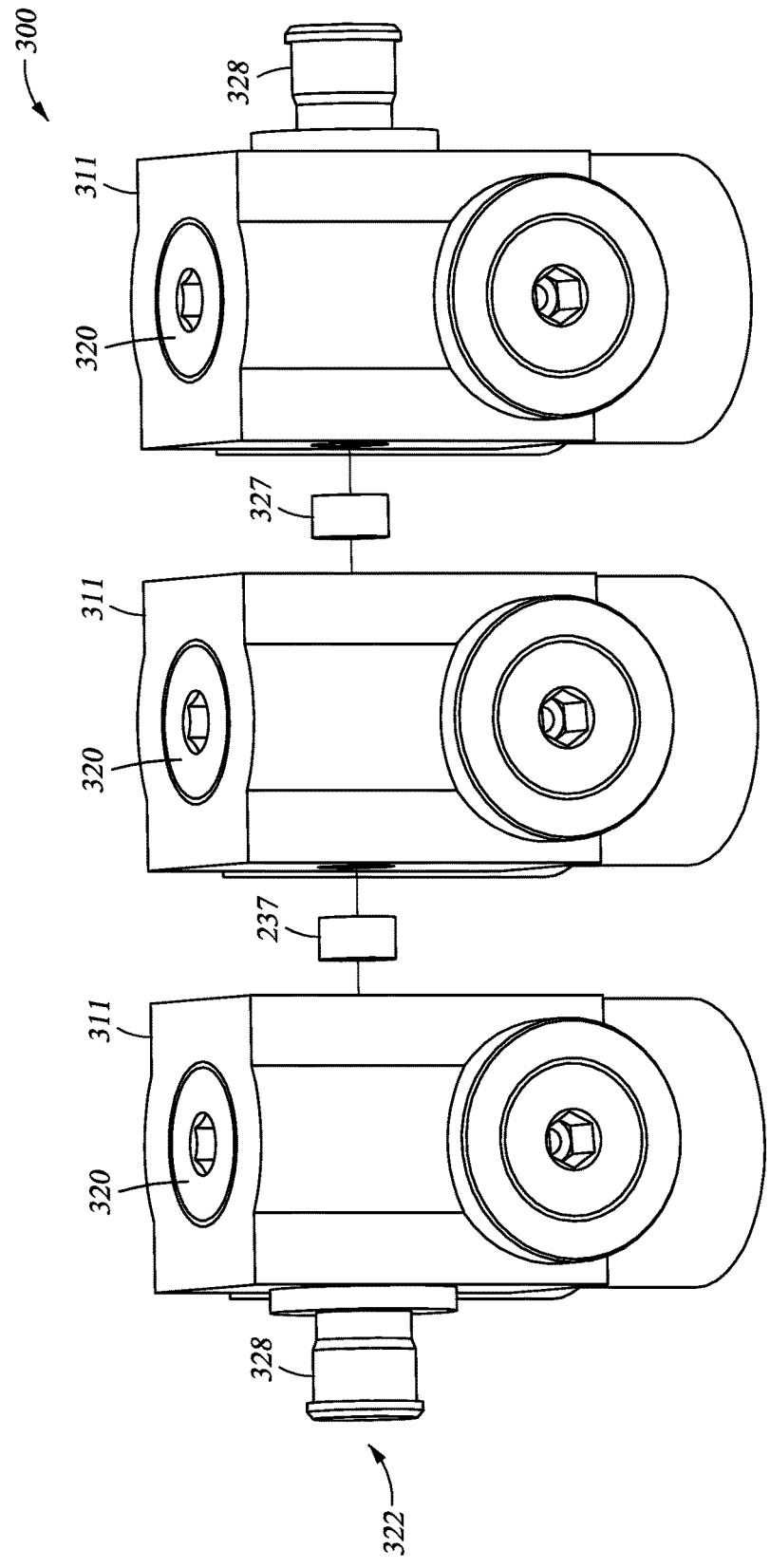
FIG. 11A is a perspective view of a triplex fluid end in accordance with one embodiment of the invention.

FIG. 11A is a perspective view of a fluid end 300 in accordance with one embodiment of the invention. The fluid end 300 is similar to the fluid ends 10, 200 described above, the full operation of which will not be repeated herein for brevity. Similar components may be identified with the same reference numbers but with a 300-series designation, such as the discharge manifold 322 and the fluid end modules 311. One difference between the fluid end 10 and the fluid end 300 is the integration of the discharge manifold 322 into each fluid end module 311 as further described below.

Figure 11B:
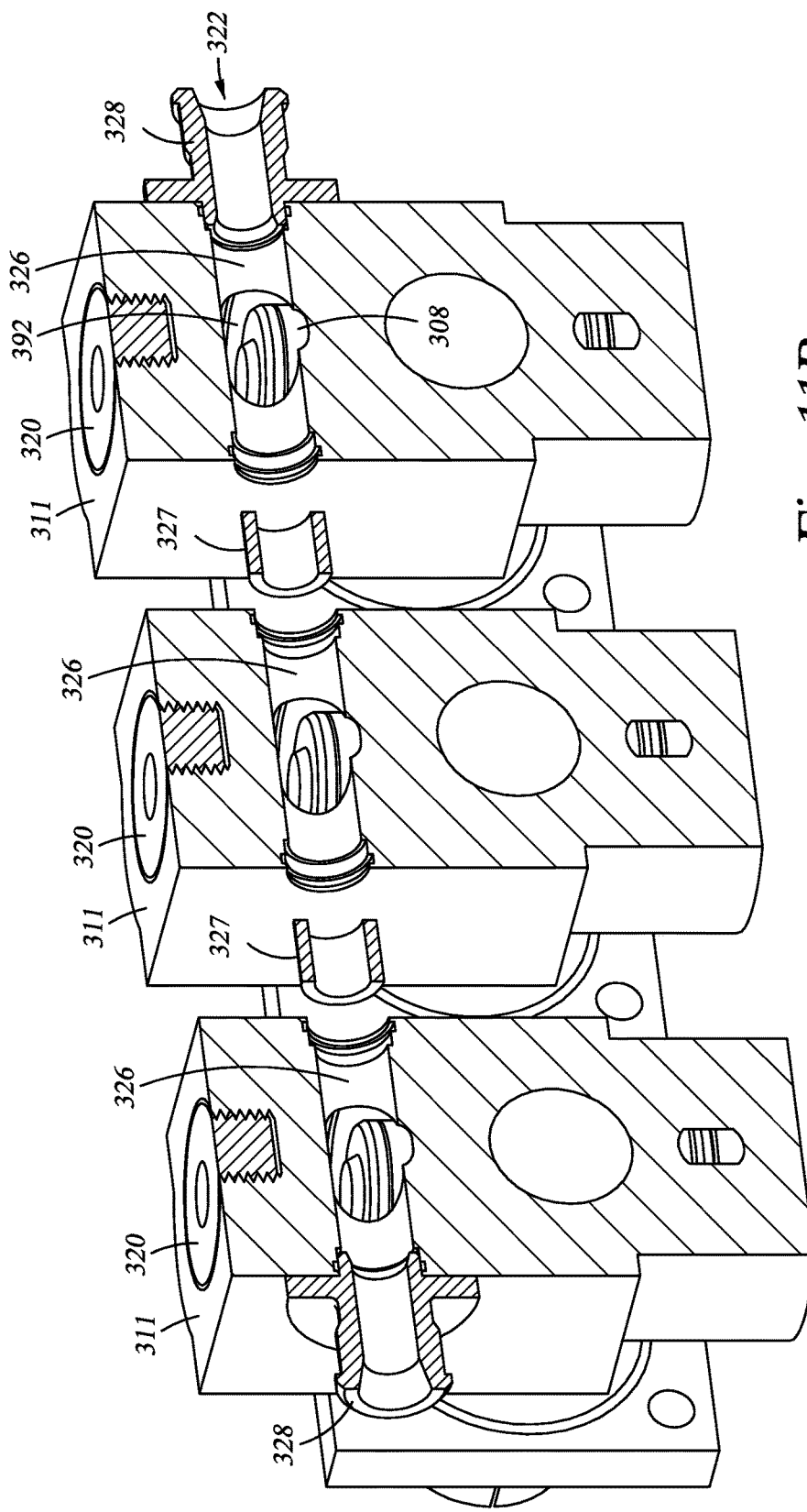
FIG. 11B is a cross-sectional view of the triplex fluid end in accordance with one embodiment of the invention.
Figure 11C:
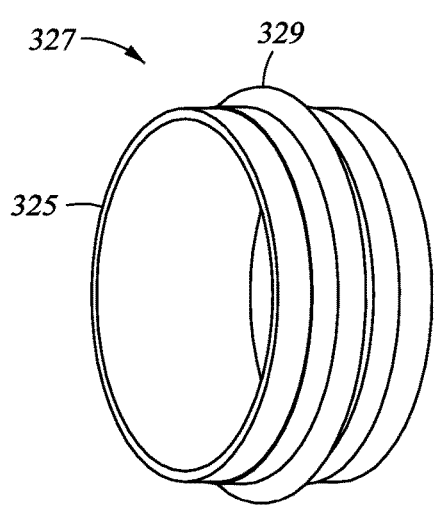
FIGS. 11C-11F illustrate a seal for use with the triplex fluid end in accordance with one embodiment of the invention.
Figure 11D:
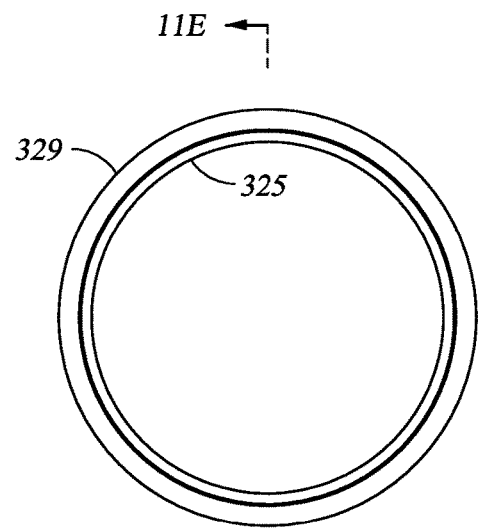
Figure 11E:
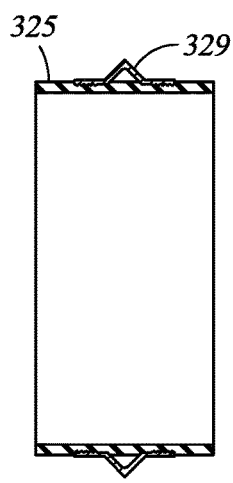
Figure 11F:
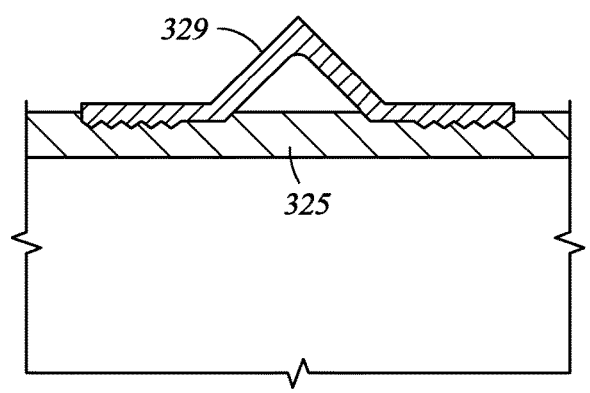

FIG. 11B is a cross-sectional view of the fluid end 300 in accordance with one embodiment of the invention. As illustrated, a manifold bore 326 is formed through the body of each fluid end module 311, and is in fluid communication with the manifold bore 326 of adjacent fluid end modules 311, thereby collectively forming the discharge manifold 322. The manifold bore 326 may intersect the discharge bore 392 of each fluid end module 311 above the discharge valve 308. The discharge cover nut 320 may be provided to access the internal components of the fluid end 300 and retain the discharge valve 308 as described above with respect to the fluid end 10.

A manifold seal 327 may be disposed between the manifold bores 326 of each fluid end module 311 to provide sealed fluid communication between the manifold bores 326. The manifold seal 327 may include a tubular or cylindrical member, and/or may include various other geometry, sizes, materials, and/or shapes as known in the art. The manifold seal 327 may be operable to tolerate large tolerance variations when the fluid end 300 assembly is made up while maintaining seal integrity. Fluid may flow from the discharge bores 392 to the manifold bores 326, and then may be directed out through flanged outlets 328 that are connected to the outermost fluid end modules 311. The compression clamp, such as compression clamps 30, 50, 230, may be used to force the fluid end modules 311 into sealed engagement via the manifold seals 327. In this manner, the discharge manifold 322 is integrally formed in the body of the fluid end modules 311 as opposed to having a discharge manifold separately connected to the fluid end modules 311, which reduces the number of fluid end 300 parts and reduces the number of connections that have to be made up and taken apart during operation of the fluid end 300.

FIGS. 11A-11F illustrate the manifold seal 327 according to one embodiment. The manifold seal 327 may include an elastomeric (rubber) seal member 325 connected to a metallic (such as brass) seal ring 329. The inner surface of the metallic seal ring 329 may be bonded to the elastomeric seal member 325. The elastomeric seal member 325 may include a cylindrical shaped member disposed through the metallic seal ring 329. The metallic seal ring 329 may include a cylindrically shaped base portion and a triangular shaped upper section.

The manifold seal 327 may be disposed between adjacent fluid end modules 311 and may seat within corresponding shaped recesses in the fluid end modules 311. The metallic seal ring 329 may be energized when compressed between two fluid end modules 311 to form a metal-to-metal seal. The elastomeric seal member 325 may be energized by pressurized fluid within the fluid end modules 311. The manifold seal 327 may include various other geometry, sizes, materials, and/or shapes as known in the art. The manifold seal 327 may be operable to tolerate large tolerance variations when the fluid end 300 assembly is made up while maintaining seal integrity.

Figure 12A:
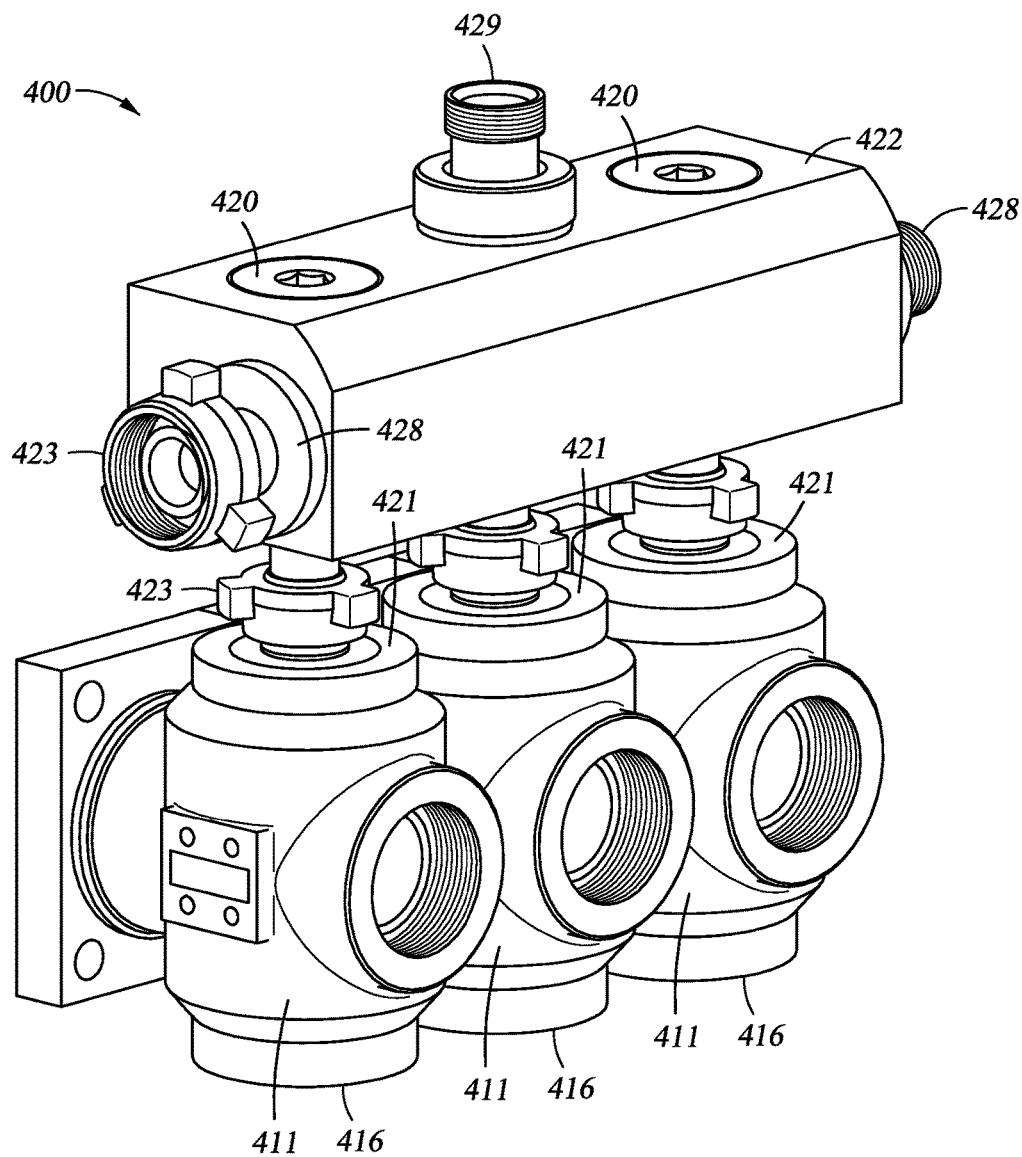
FIG. 12A is a perspective view of a triplex fluid end in accordance with one embodiment of the invention.

FIG. 12A is a perspective view of a fluid end 400 in accordance with one embodiment of the invention. The fluid end 400 is similar to the fluid ends 10, 200, 300 described above, the full operation of which will not be repeated herein for brevity. Similar components may be identified with the same reference numbers but with a 400-series designation, such as the fluid end modules 411. One difference between the fluid end 10 and the fluid end 400 is the integration of the discharge valves into the discharge manifold to form a discharge header 422 as further described below.

Figure 12B:
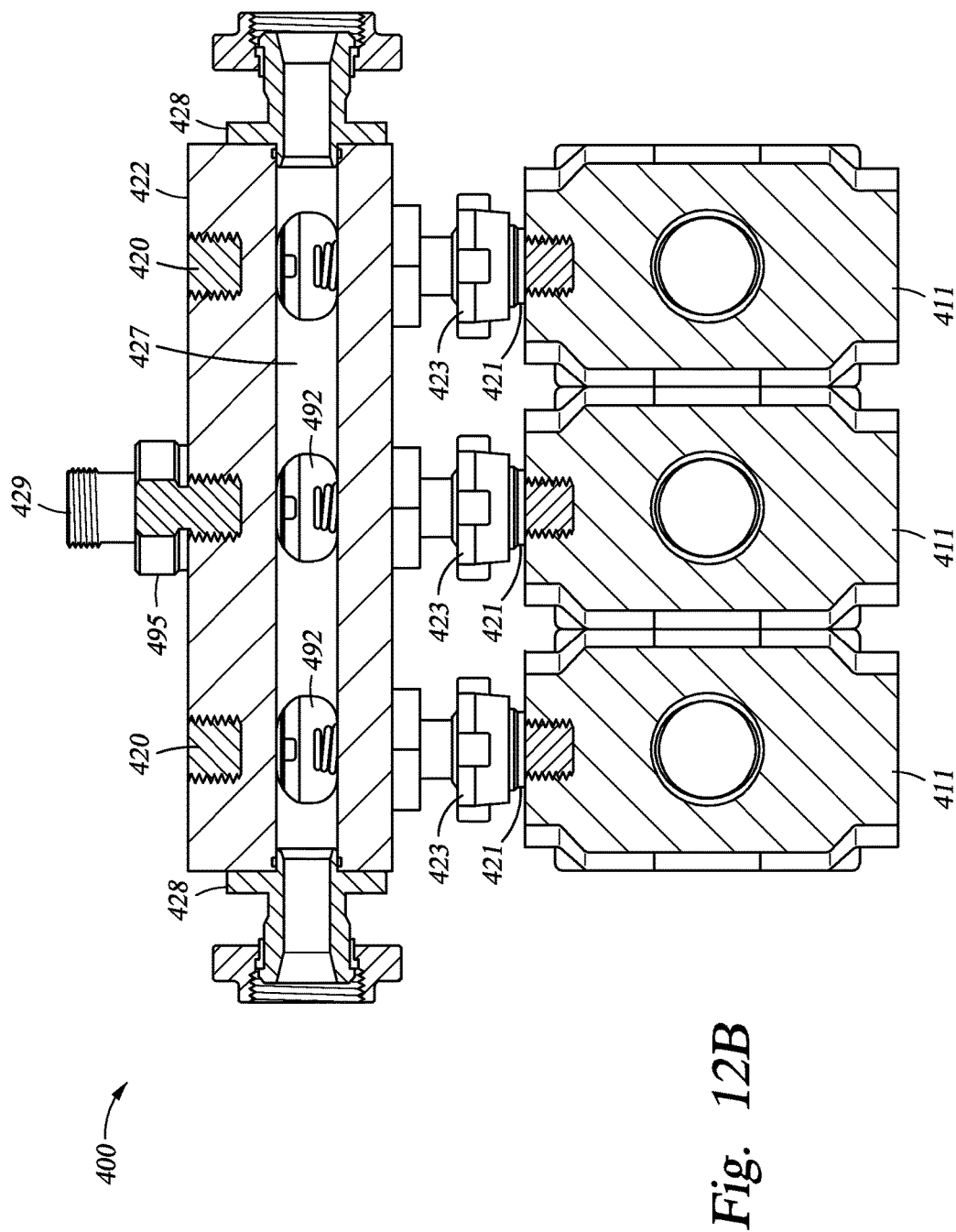
FIG. 12B is a first cross-sectional view of the triplex fluid end in accordance with one embodiment of the invention.
Figure 12C:
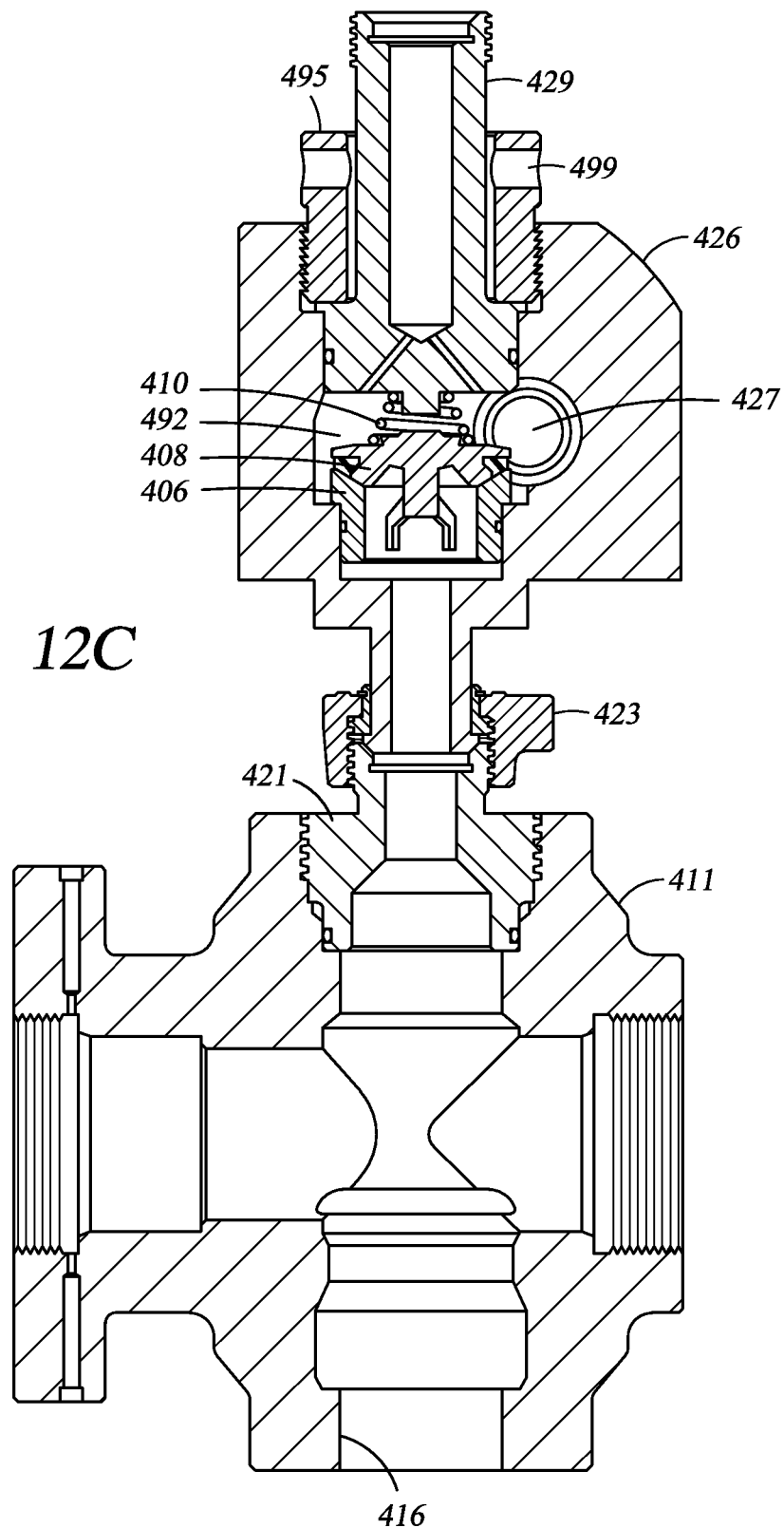
FIG. 12C is a second cross-sectional view of the triplex fluid end in accordance with one embodiment of the invention.

Referring to FIG. 12A, 12B, 12C, the fluid end 400 includes a plurality of fluid end modules 411 coupled to the discharge header 422 via one or more wing nut connections 423. In particular, each fluid end module 411 may include a module cover nut 421 that is coupled to a lower neck portion of a discharge body 426 by the wing nut connections 423. The bore of the module cover nut 421 is in fluid communication with the bore of the lower neck portion of the discharge body 426 such that fluid flowing into the intake end 416 of each fluid end module 411 flows into the discharge bore 492 of the discharge header 422 during operation of the fluid end 400. Fluid may flow into the intake end 416 through the suction valve as described above with respect to the fluid end 10.

As illustrated in FIG. 12B, 12C, the discharge valve 408, the discharge valve seat 406, and the discharge valve spring 410 may be supported in the discharge bore 492 formed in the discharge body 426. The discharge valve 408 controls fluid flow as described above with respect to the fluid ends 10, 200, 300. A manifold bore 427 intersects and is in fluid communication with each of the discharge bores 492 for each fluid end module 411. The manifold bore 427 may intersect the discharge bores 492 at a location above the discharge valve 408 and discharge valve seat 406.

Fluid may flow from the discharge bores 492 to the manifold bore 427, and then may be directed out through flanged outlets 428 that are connected at opposite ends of the discharge body 426. Discharge cover nuts 420 may be provided to access the internal components of the discharge header 422 and to retain the discharge valve 408 in the discharge bores 492 as described above. A discharge gauge connection 429 may be sealingly coupled to the discharge body 426 by a collar 495 that is threaded into engagement with the discharge bore 492.

One or more bores 499 are formed about the outer circumference of the collar 495 for engagement with a tool, such as a breaker bar or wrench end, to rotate the collar 495 into and out of threaded engagement with the discharge bore 492. The discharge gauge connection 429 may also include an inner bore and one or more ports in fluid communication with the discharge bore 492. The discharge gauge connection 429 may further include a top port with a pin thread adapted to support the connection of a pressure valve in a manner well known in the art, to provide a dynamic reading of a fluid discharge pressure of the fluid end 400.

In one embodiment, the discharge body 426 may include a single unitary body of material. In one embodiment, the discharge body 426 may be formed by multiple, separate pieces coupled together. In one embodiment, the compression clamp, such as compression clamps 30, 50, 230, may be used to force the fluid end modules 411 into engagement with each other as described above. In one embodiment, the compression clamp, such as compression clamps 30, 50, 230, may be used to force multiple, separate pieces of the discharge body 426 together.

The fluid end 400 provides the advantage of ease of access to the internal components of the discharge header 422 and the fluid end modules 411 without having to remove or disconnect the discharge header 422 from the fluid end modules 411. The integration of the discharge valves and the discharge manifold into the discharge header 422 provides the ability to easily access the discharge valve components via the cover nuts 420, 429, without having to remove an entirely separate discharge manifold assembly from the fluid end modules 411.

Figure 13A:
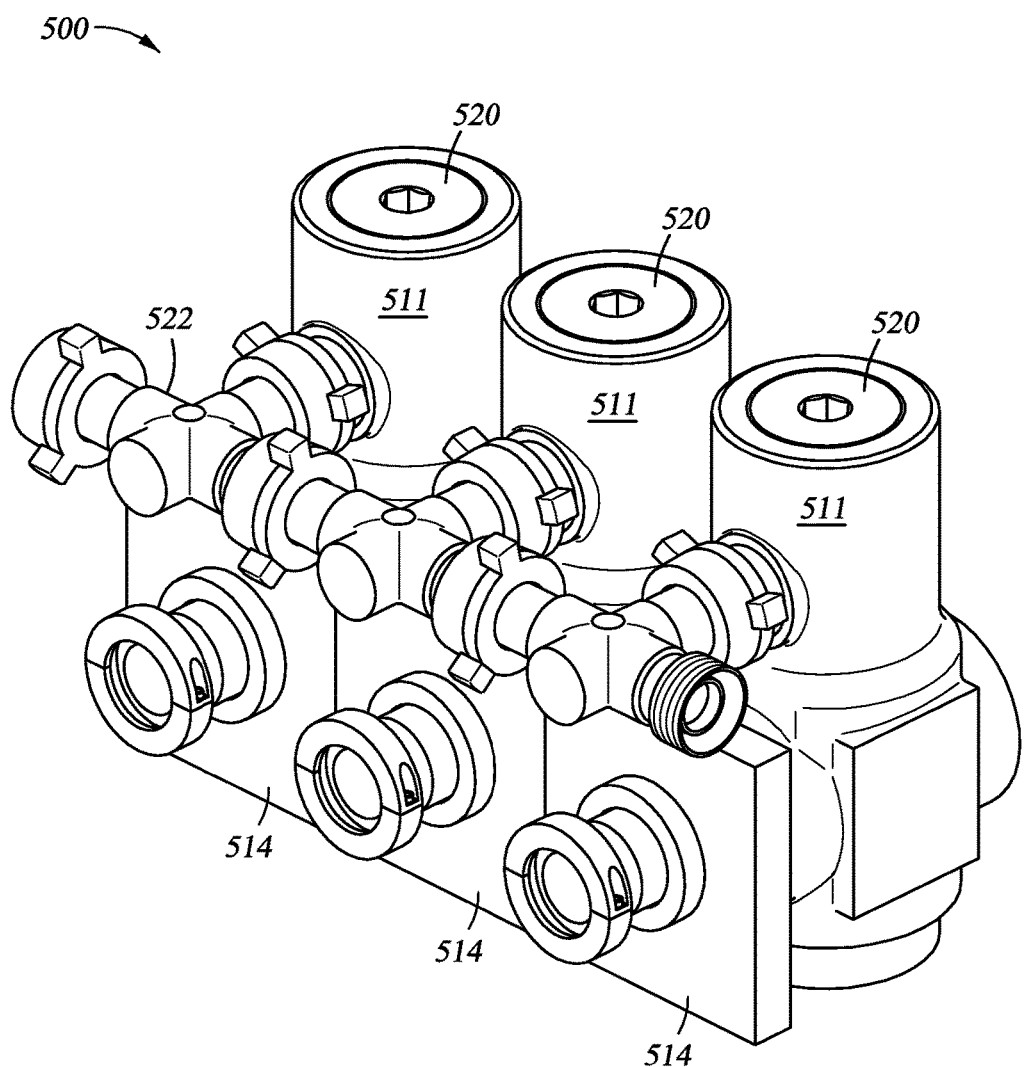
FIG. 13A is a perspective view of a triplex fluid end in accordance with one embodiment of the invention.

FIG. 13A is a perspective view of a fluid end 500 in accordance with one embodiment of the invention. The fluid end 200 is similar to the fluid ends 10, 200, 300, 400 described above, the full operation of which will not be repeated herein for brevity. Similar components may be identified with the same reference numbers but with a 500-series designation, such as the discharge manifold 522 and the fluid end modules 511. One difference between the fluid end 10 and the fluid end 500 is the location of the discharge manifold 522.

Figure 13B:
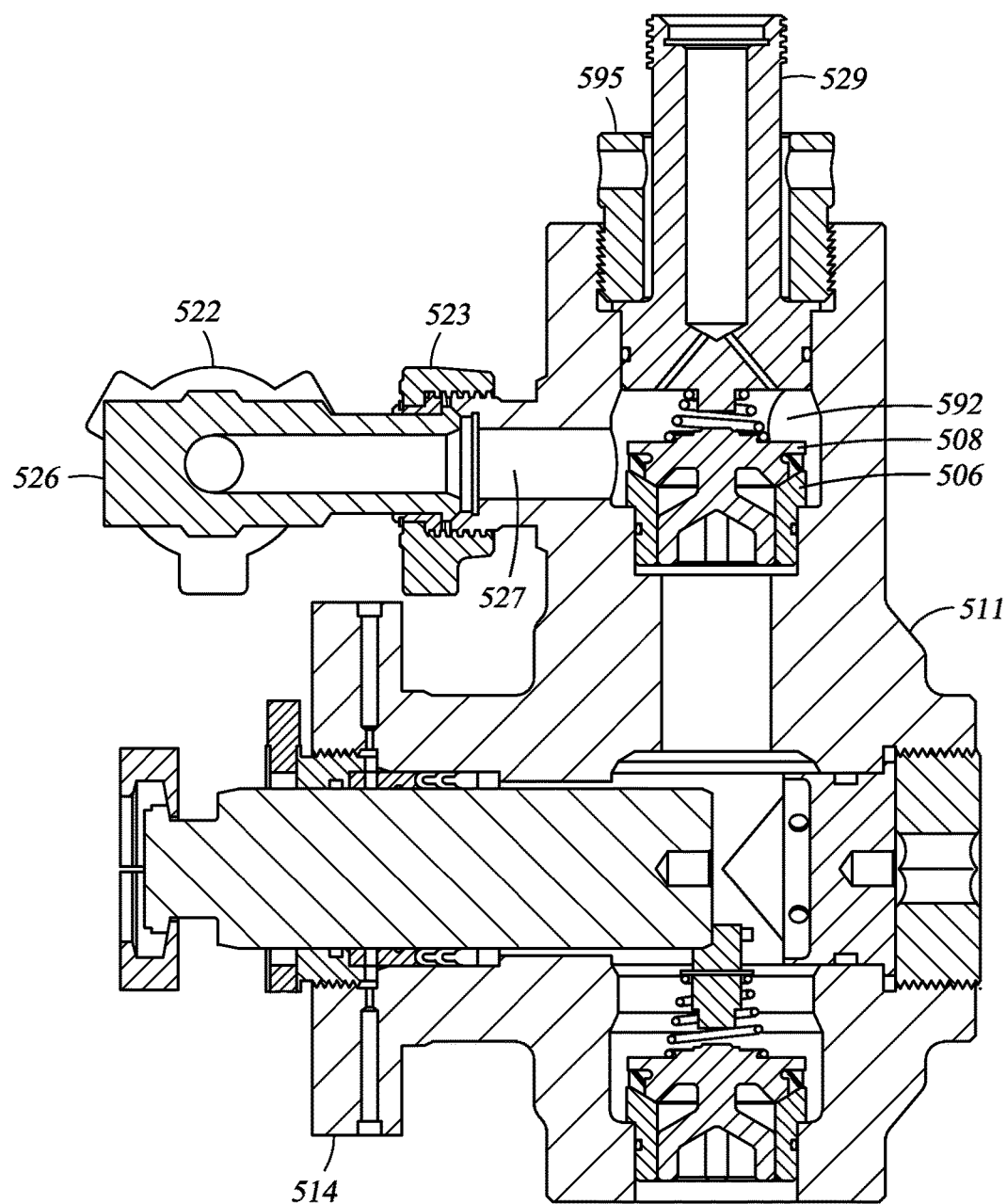
FIG. 13B is a cross-sectional view of the triplex fluid end in accordance with one embodiment of the invention.

Referring to FIG. 13B, a discharge bore 527 may be formed on the backside of each fluid end module 511 and may intersect the discharge bore 592 above the discharge valve 508 and the discharge valve seat 506. Each body 526 (cross or tee body) of the discharge manifold 522 may be coupled to the discharge bore 527 by the wing nut connections 523 or collar connections as described above. In this manner, the discharge manifold 522 may be positioned on the sides of the fluid end modules 511 above the mounting plates 514.

Fluid may flow from the discharge bores 592 to the manifold bores 527, and then may be directed out through the discharge manifold 522. Discharge cover nuts 520 (as illustrated in FIG. 13A) and/or discharge gauge connections 529 (as illustrated in FIG. 13B) may be provided to access the internal components of the fluid end modules 511 and to retain the discharge valve 508 components in the discharge bores 592 as described above. The discharge gauge connection 529 may be sealingly coupled to the central fluid end module 511 by the collar 595 that is threaded into engagement with the discharge bore 592 as described above. The discharge gauge connection 595 may also include an inner bore and one or more ports in fluid communication with the discharge bore 592. The discharge gauge connection 529 may further include a top port with a pin thread adapted to support the connection of a pressure valve in a manner well known in the art, to provide a dynamic reading of a fluid discharge pressure of the fluid end 500.

The compression clamp, such as compression clamps 30, 50, 230, may be used to force the fluid end modules 511 together as described above. The fluid end 500 provides the advantage of ease of access to the internal components of the fluid end modules 511 without having to remove or disconnect the discharge manifold 522 from the fluid end modules 511. The internal components of the fluid end modules 511 can be easily accessed via the cover nuts 520 and/or gauge connections 529, without having to remove or disconnect the discharge manifold 522.

In one embodiment, one or more components of the fluid ends 10, 200, 300, 400, 500, such as the fluid end modules and/or the discharge manifolds/headers, may be formed with compressive residual stresses at the cross bore intersections, such as the discharge, intake, and plunger bore intersections, to enhance the fatigue life of the fluid ends. In one embodiment, one or more components of the fluid ends 10, 200, 300, 400, 500, such as the fluid end modules and/or the discharge manifolds/headers, may be over-pressurized, such as by an autofrettage process as known in the art, to induce compressive residual stresses (in the fluid ends) that are opposite the stresses induced during operation of the fluid ends. The compressive residual stresses may counter stresses induced on the fluid ends during operation, thereby potentially enhancing the fatigue life of the fluid ends.

The embodiments of the invention described above are intended to be exemplary only, and not a complete description of every possible configuration of the fluid end modules 11, 211, 311, 411, 511, and the compression clamps 30, 50, 230, or the discharge manifolds 22, 222, 322, 422 (discharge header), 522. One or more embodiments of the fluid ends 10, 200, 300, 400, 500 may be combined (in whole or part) with one or more other embodiments of the fluid ends 10, 200, 300, 400, 500.

The invention claimed is:

1. A discharge manifold for a modular multiplex pump, comprising:
    a monolithic, first tee fitting coupled to a discharge port of a first module of the pump by an externally threaded collar that is threaded into engagement with the first module such that a lower neck portion of the first tee fitting is disposed within the discharge port of the first module;
    a monolithic cross fitting coupled to a discharge port of a second module of the pump by an externally threaded collar that is threaded into engagement with the second module such that a lower neck portion of the cross fitting is disposed within the discharge port of the second module, the cross fitting also coupled to the first tee fitting; and
    a monolithic, second tee fitting coupled to a discharge port of a third module of the pump by an externally threaded collar that is threaded into engagement with the third module such that a lower neck portion of the second tee fitting is disposed within the discharge port of the third module, wherein the second tee fitting is coupled to the cross fitting on a side opposite from the first tee fitting, wherein the first tee fitting, the cross fitting, and the second tee fitting form a flow bore of the discharge manifold, and wherein split rings and snap rings secure the lower neck portions of the fittings to the collars.

2. The manifold of claim 1, wherein fluid is pumped from at least one of the first, second, and third modules to the flow bore of the discharge manifold during a discharge stroke of the pump.

3. The manifold of claim 2, wherein the cross fitting includes a threaded top port.

4. The manifold of claim 3, wherein the first and second tee fittings are threadedly coupled to the cross fitting by wing nuts.

5. The manifold of claim 4, wherein the fittings are formed from 1502 iron.

6. The manifold of claim 1, wherein the modules are forced together using a compression clamp disposed entirely external to the modules, and having clamp plates and clamp fasteners coupled to the clamp plates.

7. The manifold of claim 1, wherein the discharge ports comprise manifold bores that are in fluid communication with discharge bores of the modules.

8. The manifold of claim 1, wherein the upper ends of the collars include tool insertion bores formed about the outer circumference.

9. The manifold of claim 1, wherein the split rings include an outer shoulder that contacts an inner shoulder of the collars.

10. The manifold of claim 9, wherein the lower neck portions of the fittings include an outer shoulder that contacts the bottom ends of the split rings.

11. A discharge manifold for a modular multiplex pump, comprising:
a monolithic, first tee fitting coupled to a discharge port of a first module of the pump by an externally threaded collar that is threaded into engagement with the first module such that a lower neck portion of the first tee fitting is disposed within the discharge port of the first module;
a monolithic cross fitting coupled to a discharge port of a second module of the pump by an externally threaded collar that is threaded into engagement with the second module such that a lower neck portion of the cross fitting is disposed within the discharge port of the second module, the cross fitting also coupled to the first tee fitting, and wherein the cross fitting includes a threaded top port; and
a monolithic, second tee fitting coupled to a discharge port of a third module of the pump by an externally threaded collar that is threaded into engagement with the third module such that a lower neck portion of the second tee fitting is disposed within the discharge port of the third module, wherein the second tee fitting is coupled to the cross fitting on a side opposite from the first tee fitting, wherein the first tee fitting, the cross fitting, and the second tee fitting form a flow bore of the discharge manifold, wherein fluid is pumped from at least one of the first, second, and third modules to the flow bore of the discharge manifold during a discharge stroke of the pump, and wherein the first and second tee fittings are threadedly coupled to the cross fitting by wing nuts.

12. The manifold of claim 11, wherein the fittings are formed from 1502 iron.

13. A discharge manifold for a modular multiplex pump, comprising:
a monolithic, first tee fitting coupled to a discharge port of a first module of the pump by an externally threaded collar that is threaded into engagement with the first module such that a lower neck portion of the first tee fitting is disposed within the discharge port of the first module;
a monolithic cross fitting coupled to a discharge port of a second module of the pump by an externally threaded collar that is threaded into engagement with the second module such that a lower neck portion of the cross fitting is disposed within the discharge port of the second module, the cross fitting also coupled to the first tee fitting; and
a monolithic, second tee fitting coupled to a discharge port of a third module of the pump by an externally threaded collar that is threaded into engagement with the third module such that a lower neck portion of the second tee fitting is disposed within the discharge port of the third module, wherein the second tee fitting is coupled to the cross fitting on a side opposite from the first tee fitting, wherein the first tee fitting, the cross fitting, and the second tee fitting form a flow bore of the discharge manifold, and wherein the upper ends of the collars include tool insertion bores formed about the outer circumference.

* * * * *